(12) United States Patent
Suh et al.

(10) Patent No.: US 12,511,510 B2
(45) Date of Patent: **\*Dec. 30, 2025**

(54) INTERNAL VOLTAGE GENERATOR AND SMART CARD INCLUDING THE SAME

(71) Applicant: SAMSUNG ELECTRONICS CO., LTD., Suwon-si (KR)

(72) Inventors: Jungduk Suh, Suwon-si (KR); Jisoo Chang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

This patent is subject to a terminal disclaimer.

(21) Appl. No.: 18/318,304

(22) Filed: May 16, 2023

(65) Prior Publication Data

US 2023/0281418 A1 Sep. 7, 2023

Related U.S. Application Data

(63) Continuation of application No. 17/226,334, filed on Apr. 9, 2021, now Pat. No. 11,694,050.

(30) Foreign Application Priority Data

Jul. 9, 2020 (KR) .................. 10-2020-0084735

(51) Int. Cl.
*G06K 19/07* (2006.01)

(52) U.S. Cl.
CPC ..... *G06K 19/0712* (2013.01); *G06K 19/0709* (2013.01); *G06K 19/0713* (2013.01); *G06K 19/0715* (2013.01); *G06K 19/0718* (2013.01)

(58) Field of Classification Search
CPC ............. G06K 19/0712; G06K 19/079; G06K 19/0713
See application file for complete search history.

(56) References Cited

U.S. PATENT DOCUMENTS 7,246,750 B2 7/2007 Cho
7,612,549 B1 11/2009 Kao et al.
(Continued)

FOREIGN PATENT DOCUMENTS

KR 10-2005-0024976 A 3/2005
KR 10-2010-0111778 A 10/2010
(Continued)

OTHER PUBLICATIONS

Notice of Allowance dated Jan. 22, 2025 in related Korean Patent Application No. 10-2020-0084735, 6 pages, in Korean.

*Primary Examiner* — Nabil H Syed
(74) *Attorney, Agent, or Firm* — MORGAN, LEWIS & BOCKIUS LLP

(57) ABSTRACT

An internal voltage generator of a smart card and a smart card including the same. The internal voltage generator may include: a mode detector that generates a mode signal indicating a contact mode or a contactless mode; a low-drop out (LDO) regulator including an error amplifier, where the LDO regulator is responsive to the mode signal to: in the contact mode, drive the error amplifier with a second driving voltage to generate an error voltage, and regulate the second driving voltage based on the error voltage to generate a first output voltage, and in the contactless mode, drive the error amplifier with the first driving voltage to generate the error voltage, and regulate the second driving voltage based on the error voltage to generate the first output voltage.

16 Claims, 21 Drawing Sheets

(56) References Cited

U.S. PATENT DOCUMENTS

| | | |
|---|---|---|
| 7,723,969 B1 | 5/2010 | Li |
| 8,013,473 B2 | 9/2011 | Frew et al. |
| 8,248,150 B2 | 8/2012 | Tadeparthy et al. |
| 8,680,714 B2 | 3/2014 | Lee |
| 8,944,334 B2 | 2/2015 | Cho et al. |
| 10,303,193 B2 | 5/2019 | Sautto et al. |
| 2012/0086282 A1 | 4/2012 | Lee |
| 2014/0111173 A1 | 4/2014 | Lee |
| 2017/0052552 A1 | 2/2017 | Mahmoudi et al. |
| 2020/0005108 A1 | 1/2020 | Frandsen et al. |
| 2020/0356745 A1 | 11/2020 | Yeh et al. |
| 2022/0012556 A1 | 1/2022 | Suh et al. |

FOREIGN PATENT DOCUMENTS

| | | |
|---|---|---|
| KR | 10-2012-0036405 A | 4/2012 |
| KR | 10-2012-0138202 A | 12/2012 |

| S | LSB |  |  |  |  |  | MSB | E |
|---|----|----|----|----|----|----|----|---|
|   | b1 | b2 | b3 | b4 | b5 | b6 | b7 |   |

INTERNAL VOLTAGE GENERATOR AND SMART CARD INCLUDING THE SAME

CROSS-REFERENCE TO RELATED APPLICATIONS

This application is a continuation under 35 U.S.C. § 120 of U.S. application Ser. No. 17/226,334, filed Apr. 9, 2021 in the United States Patent and Trademark Office, which claims priority under 35 USC § 119 to Korean Patent Application No. 10-2020-0084735, filed on Jul. 9, 2020, in the Korean Intellectual Property Office (KIPO), the contents of both of which are incorporated by reference herein in their entireties.

TECHNICAL FIELD

Embodiments of this disclosure relate generally to smart cards and more particularly to internal voltage generators of smart cards.

DISCUSSION OF THE RELATED ART

Smart cards, also called chip cards or integrated circuit (IC) cards, may be classified into contact cards, contactless cards, and combi-cards (or "hybrid cards") depending on how the device is used. A contact card includes on its surface a contact terminal to which external power is supplied. A contactless card includes a non-contact type terminal, such as an antenna, that receives a radio frequency (RF) signal to generate a power supply voltage and a data signal. A combi-card may operate as a contact card in a contact mode and as a contactless card in a contactless mode. Any of the above types of smart cards may further include a fingerprint sensor for fingerprint authentication to allow for secure data communication, e.g., for payment applications.

SUMMARY

Example embodiments provide an internal voltage generator in a smart card to perform fingerprint authentication. Example embodiments further provide a smart card including an internal voltage generator capable of providing output voltage stably in both a contact mode and a contactless mode.

According to some example embodiments, an internal voltage generator of a smart card (e.g., with fingerprint authentication capability) includes a mode detector, a switched capacitor circuit and a low-drop out (LDO) regulator. The mode detector generates a mode signal indicating one of a contact mode and a contactless mode, and the smart card supplies an input voltage in direct contact with an external card reader in the contact mode or supplies the input voltage from the card reader without directly contacting the card reader in the contactless mode. The switched capacitor circuit generates a first driving voltage and a second driving voltage based on a rectified voltage obtained by rectifying the input voltage, and a level of the second driving voltage is smaller than a level of the first driving voltage. The LDO regulator includes an error amplifier. The LDO regulator, in the contact mode, drives the error amplifier with the second driving voltage to generate an error voltage and regulates the second driving voltage based on the error voltage to generate a first output voltage, and in the contactless mode, drives the error amplifier with the first driving voltage to generate the error voltage, and regulates the second driving voltage based on the error voltage to generate the first output voltage.

According to some example embodiments, a smart card to perform a fingerprint authentication, includes a connection interface and a smart card chip. The connection interface, either in direct contact or without contact with an external card reader, provides a voltage received from the card reader as an input voltage. The smart card chip is coupled to the connection interface through a first power terminal and a second power terminal. The smart card chip includes an internal voltage generator, a fingerprint recognition sensor and a processor. The internal voltage generator generates a first driving voltage and a second driving voltage based on the input voltage, regulates the second driving voltage to generate a first output voltage based on the second driving voltage in a contact mode or regulates the second driving voltage to generate the first output voltage based on the first driving voltage in a contactless mode based on a mode signal, and regulates the first driving voltage to generate a second output voltage without regard to the mode signal. The mode signal indicates one of the contact mode and the contactless mode, and the smart card supplies an input voltage in direct contact with an external card reader in the contact mode or supplies the input voltage without contact with the external card reader in the contactless mode. A voltage level of the second driving voltage is smaller than a voltage level of the first driving voltage. The fingerprint recognition sensor operates based on the second output voltage, and generates a fingerprint image signal based on an input fingerprint. The processor operates based on the first output voltage, and performs the a fingerprint authentication based on the fingerprint image signal.

According to some example embodiments, an internal voltage generator of a smart card configured to perform a fingerprint authentication includes a mode detector, a switched capacitor circuit and a low-drop out (LDO) regulator. The mode detector generates a mode signal indicating one of a contact mode and a contactless mode, and the smart card supplies an input voltage in direct contact with an external card reader in the contact mode or supplies the input voltage without directly contacting the external card reader in the contactless mode. The switched capacitor circuit generates a first driving voltage and a second driving voltage based on a rectified voltage obtained by rectifying the input voltage, and a level of the second driving voltage is smaller than a level of the first driving voltage. The LDO regulator includes an error amplifier, a first power transistor and a second power transistor. The LDO regulator, in the contact mode, drives the error amplifier with the second driving voltage to generate an error voltage and regulates the second driving voltage based on the error voltage to generate a first output voltage by using the first power transistor, and in the contactless mode, drives the error amplifier with the first driving voltage to generate the error voltage, and regulates the second driving voltage based on the error voltage to generate the first output voltage by using the second power transistor.

In certain aspects, an internal voltage generator of a smart card to perform fingerprint authentication and a smart card including the same may include an LDO regulator. The LDO regulator drives an error amplifier with a second driving voltage and a first driving voltage having different voltage levels, respectively in the contact mode and the contactless mode, a first power transistor implemented with the PMOS transistor regulates the second driving voltage based on a first error voltage to provide a first output voltage in the contact mode and a second power transistor implemented with the NMOS transistor regulates the second driving voltage based on the first error voltage to provide the first output voltage in the contactless mode. Accordingly, the LDO regulator may provide the first output voltage to the logic circuit block stably in both the contact mode and the contactless mode.

BRIEF DESCRIPTION OF THE DRAWINGS

The above and other features of the present disclosure will become more apparent by describing in detail example embodiments thereof with reference to the accompanying drawings.

DETAILED DESCRIPTION OF EMBODIMENTS

Figure 1:
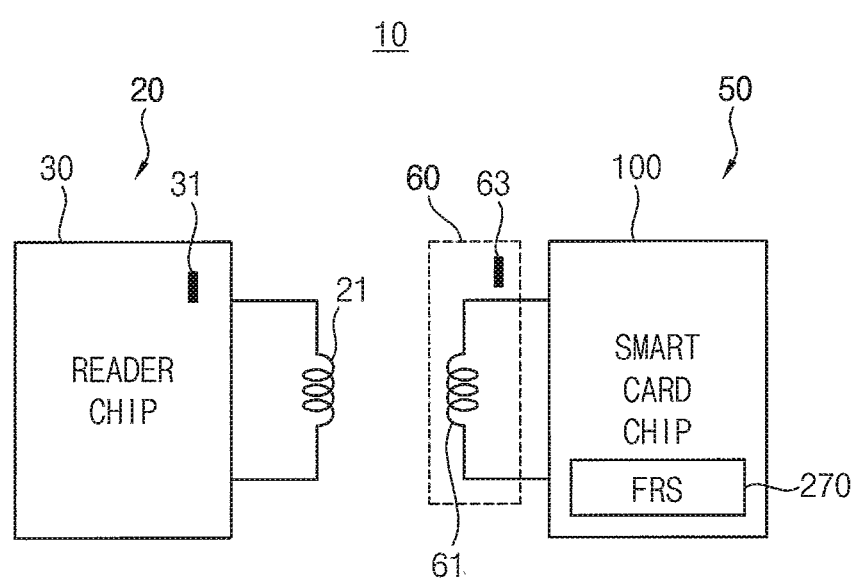
FIG. 1 is a diagram illustrating a smart card system according to some example embodiments.

Example embodiments of the present disclosure will be described more fully hereinafter with reference to the accompanying drawings. Like reference numerals may refer to like elements throughout the accompanying drawings.

FIG. 1 is a diagram illustrating a smart card system, 10, according to some example embodiments. The smart card system 10 may include a card reader 20 and a smart card 50.

The card reader 20 may include a reader chip 30 and an antenna 21. The reader chip 30 may include a card socket 31 which provides a voltage to the smart card 50 and exchanges data with the smart card 50 when the smart card 50 is in contact with the card socket 31. When the smart card 50 is inserted into the card socket 31, the reader chip 30 provides an operating voltage to the smart card 50, recognizes the smart card 50 and exchanges secure data such as payment data or confidential data with the smart card 50.

The smart card 50 may include a connection interface 60 and a smart card chip 100. The connection interface 60 may include an antenna 61 (e.g. a coil antenna) and a contact terminal 63.

The smart card 50 may communicate with the card reader 20 through the antenna 61 in a contactless manner, may receive the operating voltage from the card reader 20 and may exchange secure data with the card reader 20. When the smart card 50 is inserted into the card socket 31, the smart card 50 may receive the operating voltage through the contact terminal 63 and may exchange the secure data with the card reader 20 through the contact terminal 63.

When the smart card 50 communicates with the card reader 20 in a contactless manner, the smart card 50 may receive the operating voltage and may exchange secure data with the card reader 20 in electromagnetic form through the antennas 21 and 61.

The smart card 50 may include a fingerprint recognition sensor (FRS) 270 and may perform user authentication with respect to the secure data through the fingerprint recognition sensor 270, such as for executing a payment is executed in a contactless manner.

Figure 2:
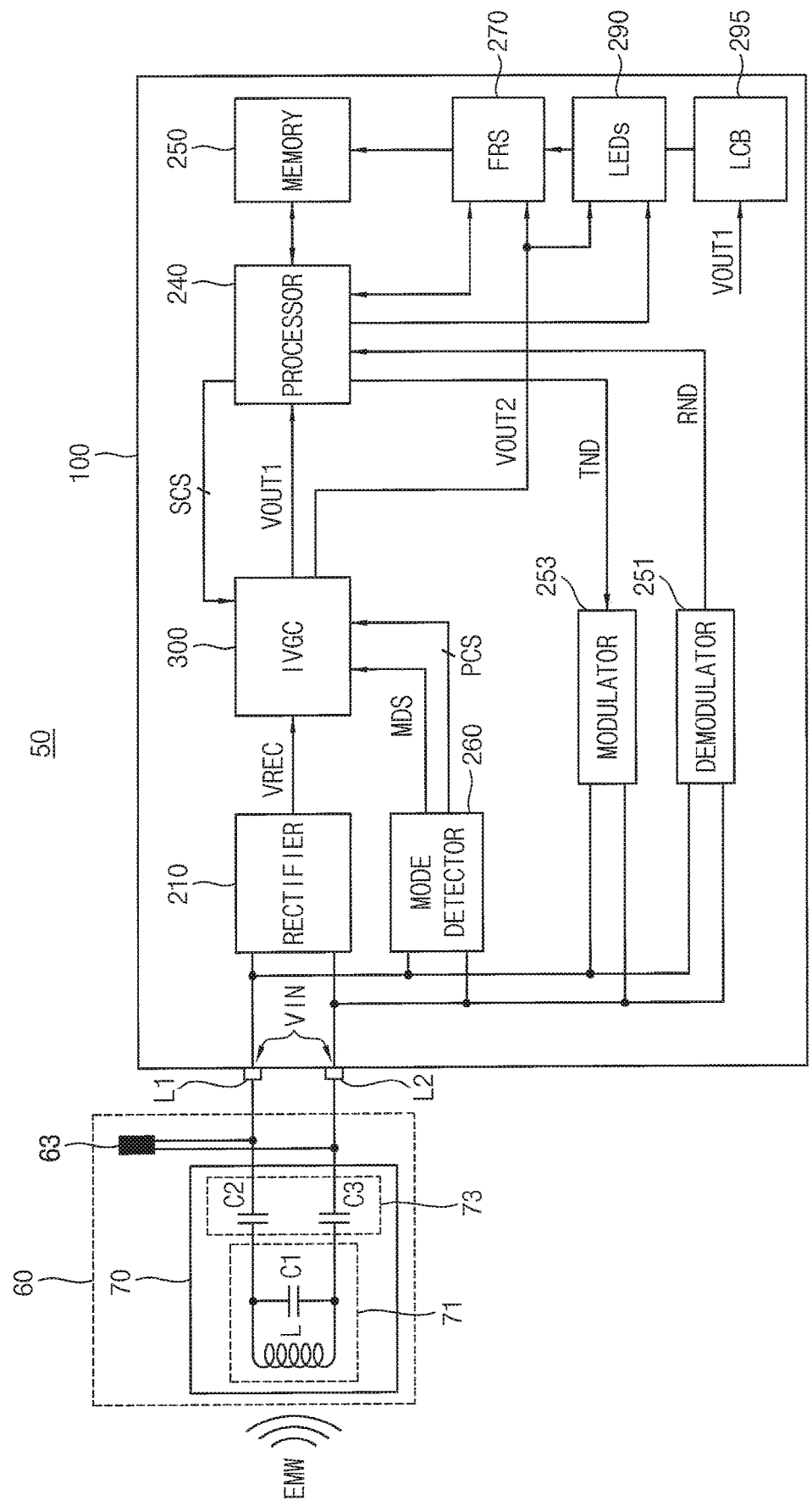
FIG. 2 is a block diagram illustrating an example of the smart card in the smart card system of FIG. 1 according to example embodiments.

FIG. 2 is a block diagram illustrating an example of the smart card 50 in the smart card system of FIG. 1 according to example embodiments. The smart card 50 may include the connection interface 60 and the smart card chip 100. The smart card chip 100 may be connected to the connection interface 60 through a first power terminal L1 and a second power terminal L2.

The connection interface 60 may include a resonant circuit unit 70. The resonant circuit unit 70 may include a resonance circuit 71 having an antenna L (an example of the antenna 61), a first capacitor C1 and a filter 73 having a second capacitor C2 and a third capacitor C3 to provide an induction voltage induced in response to an electromagnetic wave EMW to the first and second power terminals L1 and L2. The connection interface 60 may further include a contact terminal 63 that may be in direct contact with the card reader 20. Such direct contact may occur when the smart card 50 is inserted within the socket 31, e.g., a slot, of the card reader 20. The direct contact may be a direct electrical contact. When the smart card 50 is coupled to the card reader 20 in a contactless manner (e.g., when the smart card 50 is placed proximate to the card reader but not inserted within the socket 31 of card reader 20), the resonant circuit unit 70 may supply the induction voltage induced in response to the electromagnetic wave EMW to the smart chip 100 as an input voltage VIN across the first and second power terminals L1 and L2. The contactless manner may be referred to as an electromagnetic (EM) coupling state between the smart card 50 and card reader 20, or may be referred to as a state where an input voltage is provided from the card reader to the smart card and vice versa "without direct contact" between the smart card and the card reader. It is noted here that the configuration of resonant circuit unit 70 may be modified in other embodiments.

The smart card chip 100 may receive the input voltage VIN from the resonant circuit unit 70 through the first power terminal L1 and the second power terminal L2. The smart card chip 100 may receive the input voltage VIN provided through the resonant circuit unit 70 in a contact mode and may receive the input voltage VIN provided through the contact terminal 63 in a contactless mode.

The smart card chip 100 may include a rectifier 210, an internal voltage generator (IVGC) 300, a mode detector 260, a processor 240, a memory 250, a demodulator 251, a modulator 253, a fingerprint recognition sensor 270, LEDs 290 and a logic circuit block (LCB) 295.

The rectifier 210 may generate a rectified voltage VREC, which is direct current (DC) voltage, by rectifying the input voltage VIN.

The internal voltage generator 300 may generate a first driving voltage (e.g. VDD1 shown in FIG. 5) and a second driving voltage (e.g. VDD2 of FIG. 5) having a level smaller than that of the first driving voltage by using the rectified voltage VREC, based on a mode signal MDS, and may generate a first output voltage VOUT1 and a second output voltage VOUT2 based on the first driving voltage and the second driving voltage.

The mode signal MDS may indicate (at any given time) a contact mode or a contactless (non-contact) mode. For example, when the mode signal MDS is at a first voltage level, it indicates the contact mode, and when the mode signal MDS is at a second, different voltage level, it indicates the contactless mode. The internal voltage generator 300 may regulate the second driving voltage to generate the first output voltage VOUT1 based on the second driving voltage in the contact mode, may regulate the second driving voltage to generate the first output voltage VOUT1 based on the first driving voltage in a contactless mode, based on the mode signal MDS, and may regulate the first driving voltage to generate the second output voltage VOUT2 independently of the mode signal MDS (e.g., the first driving voltage is regulated to generate VOUT2 in the same manner in any one of multiple possible states of the mode signal MDS).

The internal voltage generator 300 may provide the first output voltage VOUT1 to the processor 240 and the logic circuit block 295 and may provide the second output voltage VOUT2 to the fingerprint recognition sensor 270 and the LEDs 290.

The mode detector 260 may receive the input voltage VIN as a "contact voltage" in the contact mode, may receive the input voltage VIN as a "contactless voltage" in the contactless mode, may compare the contact voltage and the contactless voltage, and may output the mode signal MDS indicating one of the contact mode and the contactless mode based on a result of the comparison. In an example embodiment, the mode detector 260 may provide power switch control signals PCS to the internal voltage generator 300 based on the contact mode and the contactless mode.

In an example embodiment, the mode detector 260 may be included in the internal voltage generator 300. In another example embodiment, the mode detector 260 may be disposed at outside of the internal voltage generator 300.

The processor 240 may control the overall operation of the smart card chip 100.

When the signal reception operation is performed, the demodulator 251 generates the reception data RND by demodulating the signal supplied from the connection interface 60 through the first and second power terminals L1 and L2 to provide the reception data RND to the processor 240. The processor 240 may store the reception data RND in the memory 250.

When the signal transmission operation is performed, the processor 240 reads out the output data from the memory 250 and encodes the output data to provide transmission data TND to the modulator 253 and the modulator 253 may modulate the transmission data TND to provide a modulation signal to the first and second power terminals L1 and L2. For instance, the modulator 253 may generate the modulation signal by performing load modulation with respect to the transmission data TND.

The processor 240 may provide switch control signals SCS to the internal voltage generator 300.

The memory 250 may store a user's original fingerprint registered through a pre-processing operation. The fingerprint recognition sensor 270 may generate a fingerprint image signal based on a user's input fingerprint in a secure data exchange operation (e.g., a payment operation) during the contactless mode, and may provide the fingerprint image signal to the processor 240. The processor 240 may compare the fingerprint image signal with the user's original fingerprint and may determine whether the user's input fingerprint is genuine or faked based on a result of the comparison. When the processor 240 determines that the user's input fingerprint matches the user's original fingerprint, the processor 240 may indicate that the user authentication is passed by controlling the LEDs 295 to emit light while performing the user authentication on the secure data associated with the secure data exchange operation. When the processor 240 determines that the user's input fingerprint does not match the user's original fingerprint, the processor 240 may indicate that the input fingerprint does not match the user's original fingerprint through the LEDs 295.

Figure 3:
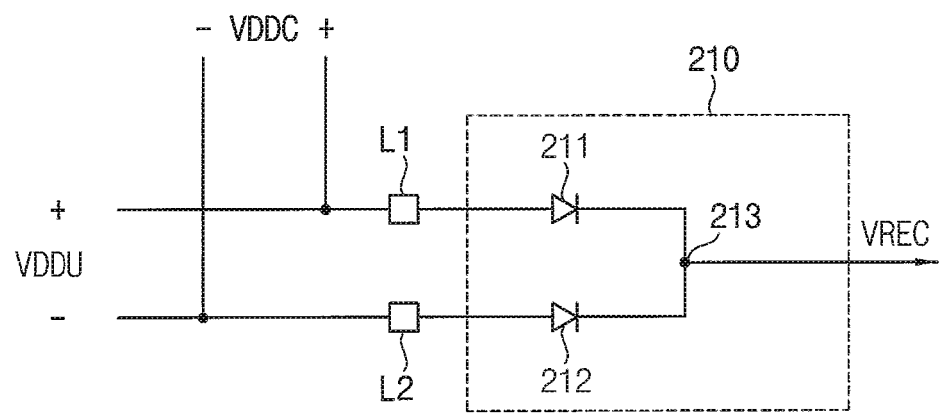
FIG. 3 illustrates an example of the rectifier in the smart card chip in FIG. 2 according to example embodiments.

FIG. 3 illustrates an example of the rectifier 210 in the smart card chip in FIG. 2 according to example embodiments. Here, the rectifier 210 may include a first diode 211 and a second diode 212.

The first diode 211 may have an anode connected to the first power terminal L1 and a cathode connected to an output node 213. The second diode 212 may have an anode connected to the second power terminal L2 and a cathode connected to the output node 213. The first and second diode 211 and 212 may rectify a contact voltage VDDC provided through the contact terminal 63 in FIG. 2 to provide the rectified voltage VREC to the internal voltage generator 300 in the contact mode. The first and second diode 211 and 212 may collectively rectify a contactless voltage VDDU provided through the resonance unit 70 n FIG. 2 to provide the rectified voltage VREC to the internal voltage generator 300 in the contactless mode.

Figure 4:
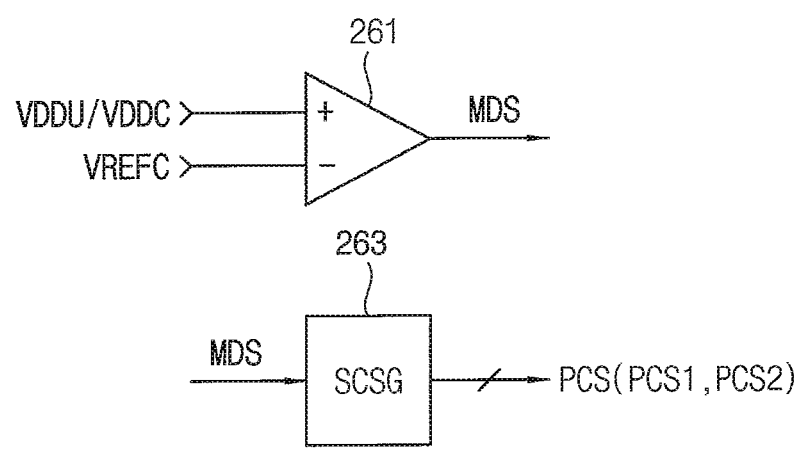
FIG. 4 illustrates an example of the mode detector in the smart card chip in FIG. 2 according to example embodiments.

FIG. 4 illustrates an example of the mode detector 260 in the smart card chip in FIG. 2 according to example embodiments. The mode detector 260 may include a comparator 261 and a switch control signal generator (SCSG) 263.

The comparator 261 "compares the contact voltage VDDC and the contactless voltage VDDU" by comparing a voltage applied to its positive input terminal (connected to the terminal L1) with a reference voltage VREFC applied to its negative input terminal. The comparator 261 outputs the mode signal MDS indicating one of the contact mode and the contactless mode based on a result of the comparison. When the smart card 100 is connected in the contactless manner, a voltage level of the contactless voltage VDDU is greater than the reference voltage VREFC and the comparator 261 may output the mode signal MDS with a first logic level (e.g. logic high level). When the smart card 100 is connected in the contact manner, a voltage level of the contact voltage VDDC is smaller than the reference voltage VREFC and the comparator 261 may output the mode signal MDS with a second logic level (e.g. logic low level).

The switch control signal generator 263 may determine logic levels of the power switch control signals PCS including a first power switch control signal PCS1 and a second power switch control signal PCS2 based on the mode signal MDS and may provide the first power switch control signal PCS1 and the second power switch control signal PCS2 to the internal voltage generator 300. The switch control signal generator 263 may generate the first power switch control signal PCS1 and the second power switch control signal PCS2 based on the mode signal MDS such that the first power switch control signal PCS1 and the second power switch control signal PCS2 have complementary logic levels with respect to each other.

Figure 5:
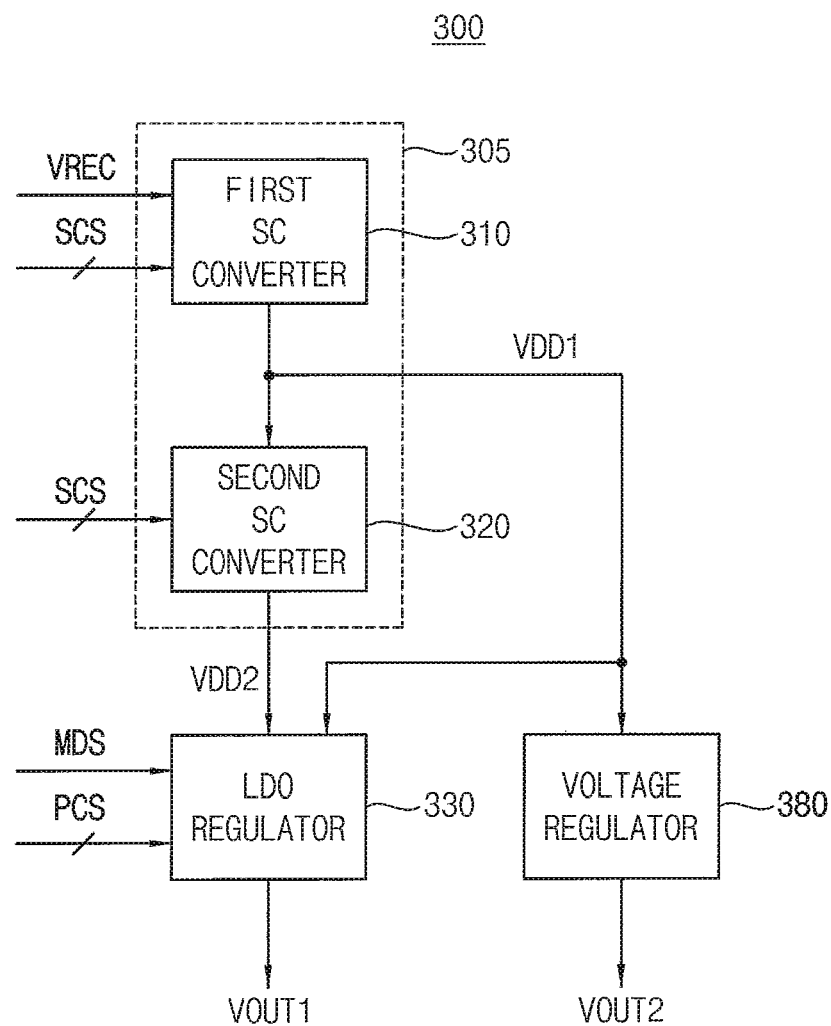
FIG. 5 is a block diagram illustrating an example of the internal voltage generator in the smart card chip in FIG. 2 according to example embodiments.
Figure 5:
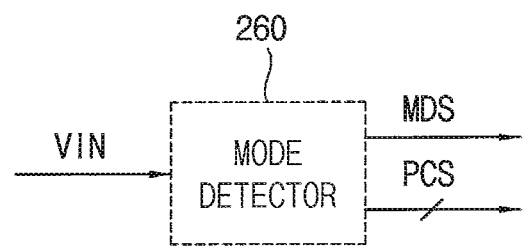

FIG. 5 is a block diagram illustrating an example of the internal voltage generator in the smart card chip in FIG. 2 according to example embodiments.

Referring to FIG. 5, the internal voltage generator 300 may include a switched capacitor circuit 305, a low-drop out (LDO) regulator 330 and a voltage regulator 380. The switched capacitor circuit 305 may include a first switched capacitor (SC) converter 310 and a second switched capacitor (SC) converter 320.

The switched capacitor circuit 305 may receive the rectified voltage VREC and may generate a first driving voltage VDD1 and a second driving voltage VDD2 by converting the rectified voltage VREC. The first switched capacitor converter 310 may convert the rectified voltage VREC to the first driving voltage VDD1 based on the switch control signals SCS and the second switched capacitor converter 320 may convert the first driving voltage VDD1 to the second driving voltage VDD2 based on the switch control signals SCS. The switched capacitor circuit 305 may provide the first driving voltage VDD1 and the second driving voltage VDD2 to the LDO regulator 330 and may provide the first driving voltage VDD1 to the voltage regulator 380.

The rectified voltage VRET may have a first voltage level, the first driving voltage VDD1 may have a second voltage level smaller than the first voltage level, and the second driving voltage VDD2 may have a third voltage level smaller than the second voltage level. In embodiments, the second voltage level may correspond to a half of the first voltage level and the third voltage level may correspond to a half of the second voltage level.

The LDO regulator 330 may include an error amplifier. The LDO regulator 330, based on the mode signal MDS and the power switch control signals PCS, may drive the error amplifier with the second driving voltage VDD2 to generate an error voltage, and may regulate the second driving voltage VDD2 based on the error voltage to generate a first output voltage VOUT1 in the contact mode. The LDO regulator 330, based on the mode signal MDS and the power switch control signals PCS, may drive the error amplifier with the first driving voltage VDD1 to generate the error voltage, and may regulate the second driving voltage VDD2 based on the error voltage to generate the first output voltage VOUT1 in the contactless mode.

The voltage regulator 380 may regulate the second driving voltage VDD2 to generate a second output voltage VDD1 independently of the mode signal MDS.

In embodiments, the internal voltage generator 300 may further include the mode detector 260. The mode detector 260 may generate the mode signal MDS and the power switch control signals PCS based on the input voltage VIN as described with reference to FIG. 4.

Figure 6:
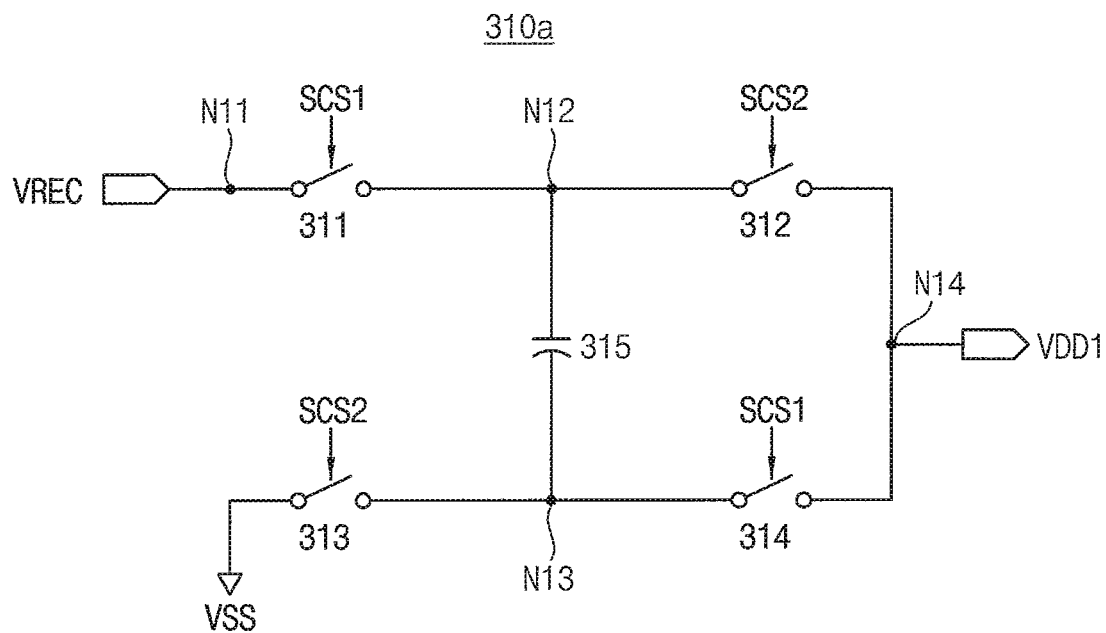
FIG. 6 is a circuit diagram illustrating an example of the first switched capacitor in the internal voltage generator of FIG. 5 according to example embodiments.

FIG. 6 is a circuit diagram illustrating an example of the first switched capacitor in the internal voltage generator of FIG. 5 according to example embodiments.

Referring to FIG. 6, a first switched capacitor converter 310a may include first, second, third and fourth switches 311, 312, 313 and 314 and a capacitor 315.

The first switch 311 is connected between a first node N11 receiving the rectified voltage VREC and a second node N12, and is switched in response to a first switch control signal SCS1. The capacitor 315 is coupled between the second node N12 and a third node N13. The second switch 312 is connected between the second node N12 and a fourth node N14 providing the first driving voltage VDD, and is switched in response to a second switch control signal SCS2.

The third switch 313 is connected between the third node N13 and a ground voltage VSS, and is switched in response to the second switch control signal SCS2. The fourth switch 314 is connected between the third node N13 and the fourth node N14, and is switched in response to the first switch control signal SCS1.

The first switch control signal SCS1 and the second switch control signal SCS2 may have a same logic level. The first switch 311 and the fourth switch 314 may be turned-on in response to the first switch control signal SCS1 having a low level and may be turned-off in response to the first switch control signal SCS1 having a high level. The second switch 312 and the third switch 313 may be turned-off in response to the second switch control signal SCS2 having a low level and may be turned-on in response to the second switch control signal SCS2 having a high level.

Figure 7:
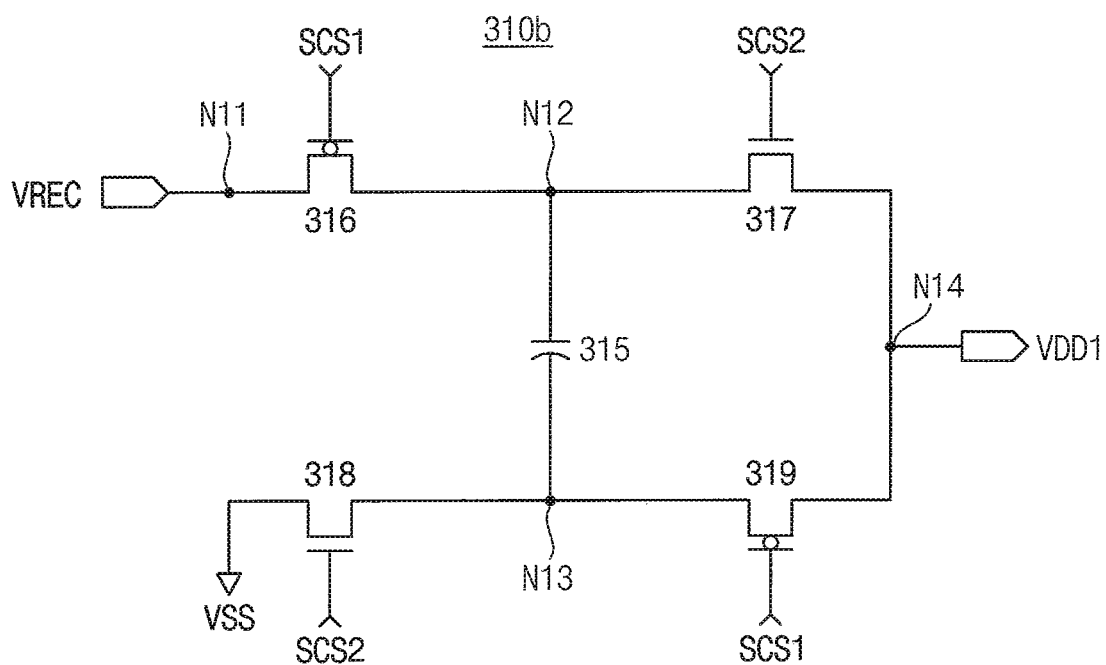
FIG. 7 is a circuit diagram illustrating another example of the first switched capacitor in the internal voltage generator of FIG. 5 according to example embodiments.

FIG. 7 is a circuit diagram illustrating another example of the first switched capacitor in the internal voltage generator of FIG. 5 according to example embodiments.

Referring to FIG. 7, a first switched capacitor converter 310b may include p-channel metal-oxide semiconductor (PMOS) transistors 316 and 319, n-channel metal-oxide semiconductor (NMOS) transistors 317 and 318 and a capacitor 315.

The PMOS transistor 316 is connected between the first node N11 receiving the rectified voltage VREC and the second node N12, and is turned-on/off in response to the first switch control signal SCS1. The NMOS transistor 317 is connected between the second node N12 and the fourth node N14 providing the first driving voltage VDD, and is turned-on/off in response to the second switch control signal SCS2. The capacitor 315 is coupled between the second node N12 and the third node N13.

The NMOS transistor 318 is connected between the third node N13 and the ground voltage VSS, and is turned-on/off in response to the second switch control signal SCS2. The PMOS transistor 319 is connected between the third node N13 and the fourth node N14, and is turned-on/off in response to the first switch control signal SCS1.

FIGS. 6 and 7 illustrate examples of the first switched capacitor converter 310 in FIG. 5, respectively, and a configuration of the second switched capacitor converter 320 may be the same as a configuration of the first switched capacitor converter 310.

Figure 8:
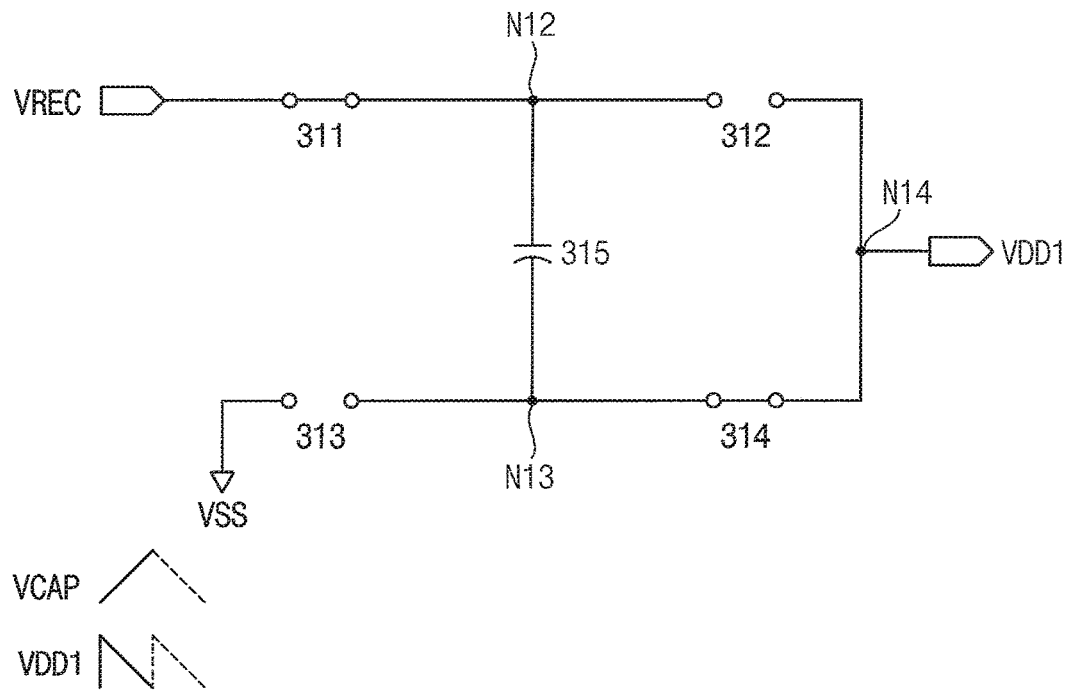
FIG. 8 illustrates an example operation of the first switched capacitor converter in FIG. 6.

FIG. 8 illustrates an example operation of the first switched capacitor converter in FIG. 6.

An operation of the first switched capacitor converter 310b in FIG. 7 may be the same as operation of the first switched capacitor converter 310a in FIG. 6.

Referring to FIG. 8, when the first switch 311 and the fourth switch 314 are turned-on and the second switch 312 and the third switch 313 are turned-off during a first phase, a voltage VCAP is stored in the capacitor 315 based on the rectified voltage VREC, and the first driving voltage VDD1 is provided at the fourth node N14 based on the voltage VCAP stored in the capacitor 315.

Figure 9:
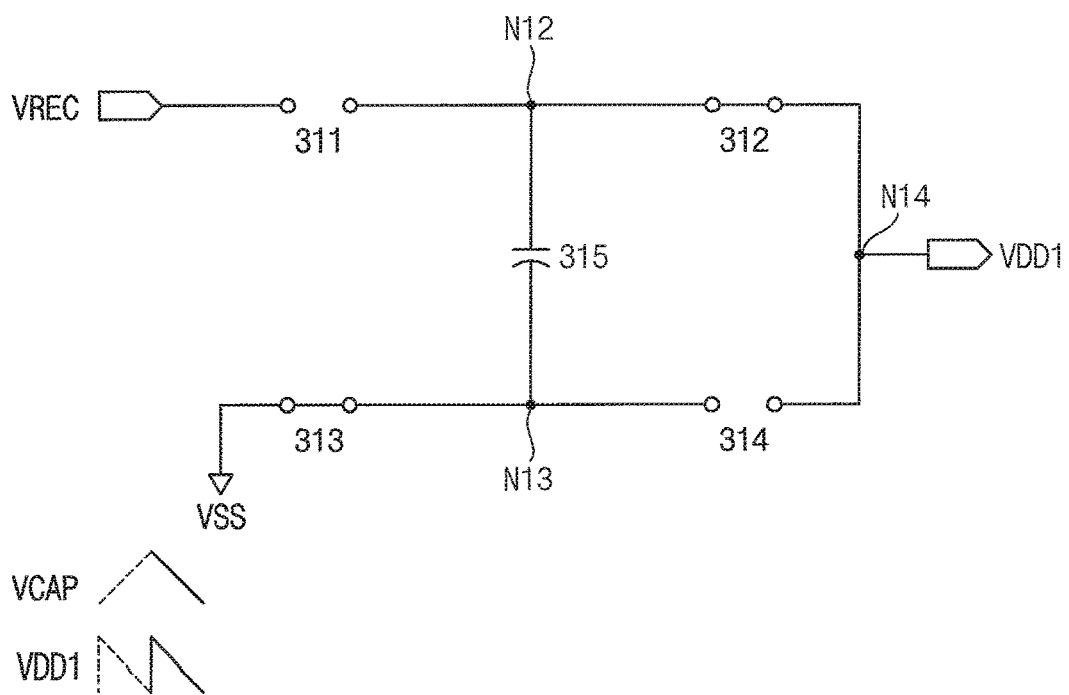
FIG. 9 illustrates an example operation of the first switched capacitor converter in FIG. 6.

FIG. 9 illustrates an example operation of the first switched capacitor converter in FIG. 6.

An operation of the first switched capacitor converter 310b in FIG. 7 may be the same as operation of the first switched capacitor converter 310a in FIG. 6.

Referring to FIG. 9, when the first switch 311 and the fourth switch 314 are turned-off and the second switch 312 and the third switch 313 are turned-on during a second phase, a voltage VCAP stored in the capacitor 315 during the first phase linearly decreases and the first driving voltage VDD1 is provided at the fourth node N14 based on the voltage VCAP stored in the capacitor 315.

Figure 10:
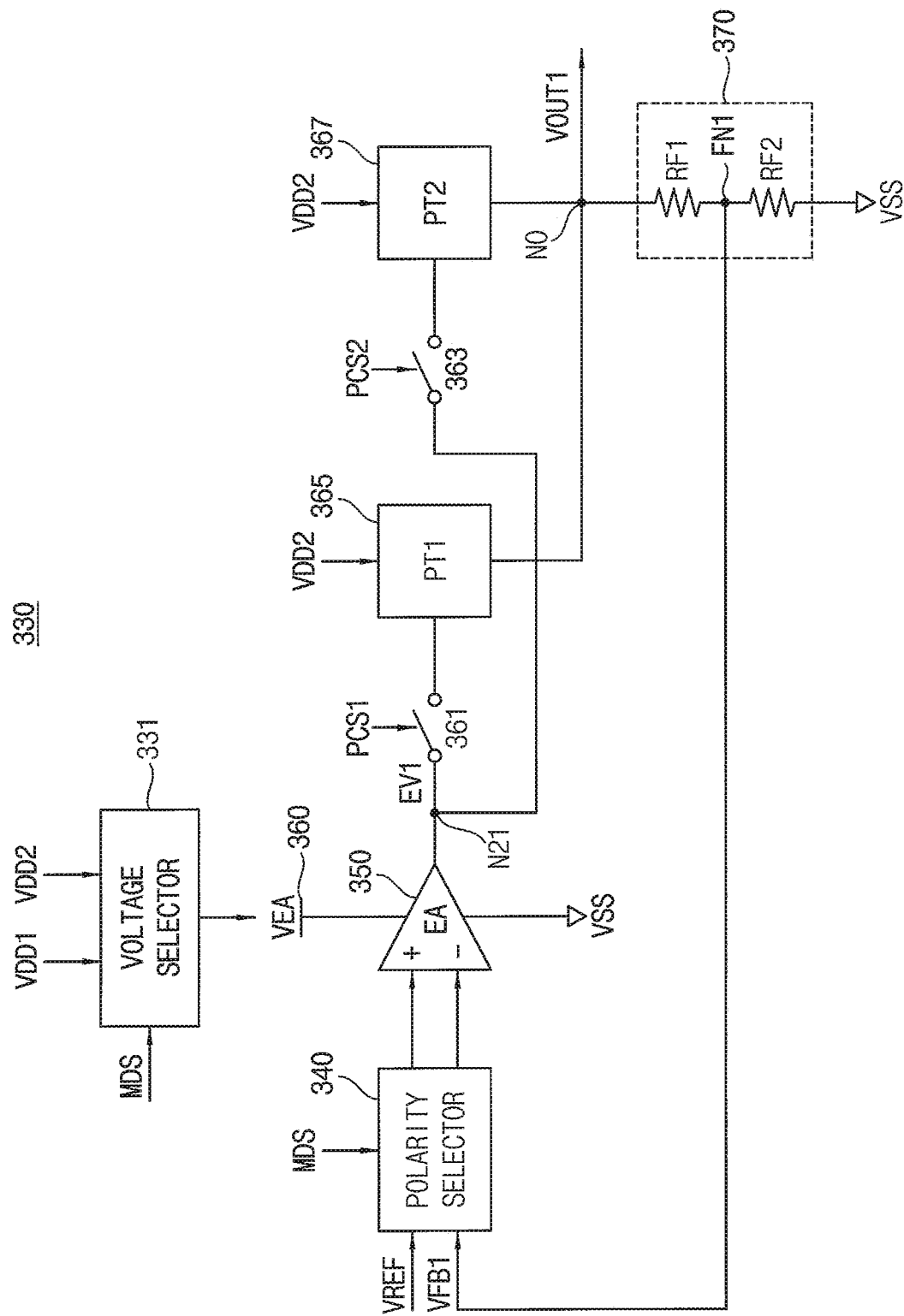
FIG. 10 is a circuit diagram illustrating an example of the LDO regulator in the internal voltage generator of FIG. 5 according to example embodiments.

FIG. 10 is a circuit diagram illustrating an example of the LDO regulator in the internal voltage generator of FIG. 5 according to example embodiments.

Referring to FIG. 10, the LDO regulator 330 may include a voltage selector 331, a polarity selector 340, an error amplifier 350, a first power switch 361, a first power transistor (PT1) 365, a second power switch 363, a second power transistor (PT2) 367 and a feedback circuit 370.

The voltage selector 360 may provide a power terminal 360 of the error amplifier 350 with one of the first driving voltage VDD1 and the second driving voltage VDD2 in response to the mode signal MDS as an error amplifier power supply voltage VEA.

The polarity selector c340 may provide a reference voltage VREF and a feedback voltage VFB1 to either a negative input terminal and a positive input terminal of the error amplifier 350 or the positive input terminal and the negative input terminal of the error amplifier 350, respectively, based on the mode signal MDS.

The error amplifier 350, connected between the power terminal 360 and the ground voltage VSS, may amplify a difference between a feedback voltage VFB1 and the reference voltage VREF to output a first error voltage EV1 to a first node N21. The first node N21 may correspond to an output terminal of the error amplifier 350. The power terminal 360 may receive one of the first driving voltage VDD1 and the second driving voltage VDD2. The first error voltage EV1 may be also referred to as an error voltage. The feedback voltage VFB1 may be also referred to as a first feedback voltage.

The first power switch 361 may be connected between the first node N21 and the first power transistor 365, and may be switched in response to the first power switch control signal PCS1. The first power transistor 365 may be connected between the second driving voltage VDD2 and an output node NO providing the first output voltage VOUT1.

The second power switch 363 may be connected between the first node N21 and the second power transistor 367, and may be switched in response to the second power switch control signal PCS2. The second power transistor 367 may be connected between the second driving voltage VDD2 and the output node NO in parallel with the first power transistor 365. The second power transistor 367 may have a type different from a type of the first power transistor 365.

The feedback circuit 370 is connected between the output node NO and the ground voltage VSS, and may divide the first output voltage VOUT1 to provide the feedback voltage VFB1. The feedback circuit 370 includes a first feedback resistor RF1 and a second feedback resistor RF2 connected in series between the output node NO and the ground voltage VSS. The first feedback resistor RF1 and the second feedback resistor RF2 are connected to each other at a feedback node FN1, and the feedback circuit 370 provides a voltage of the feedback node FN1 as the feedback voltage VFB1.

Figure 11:
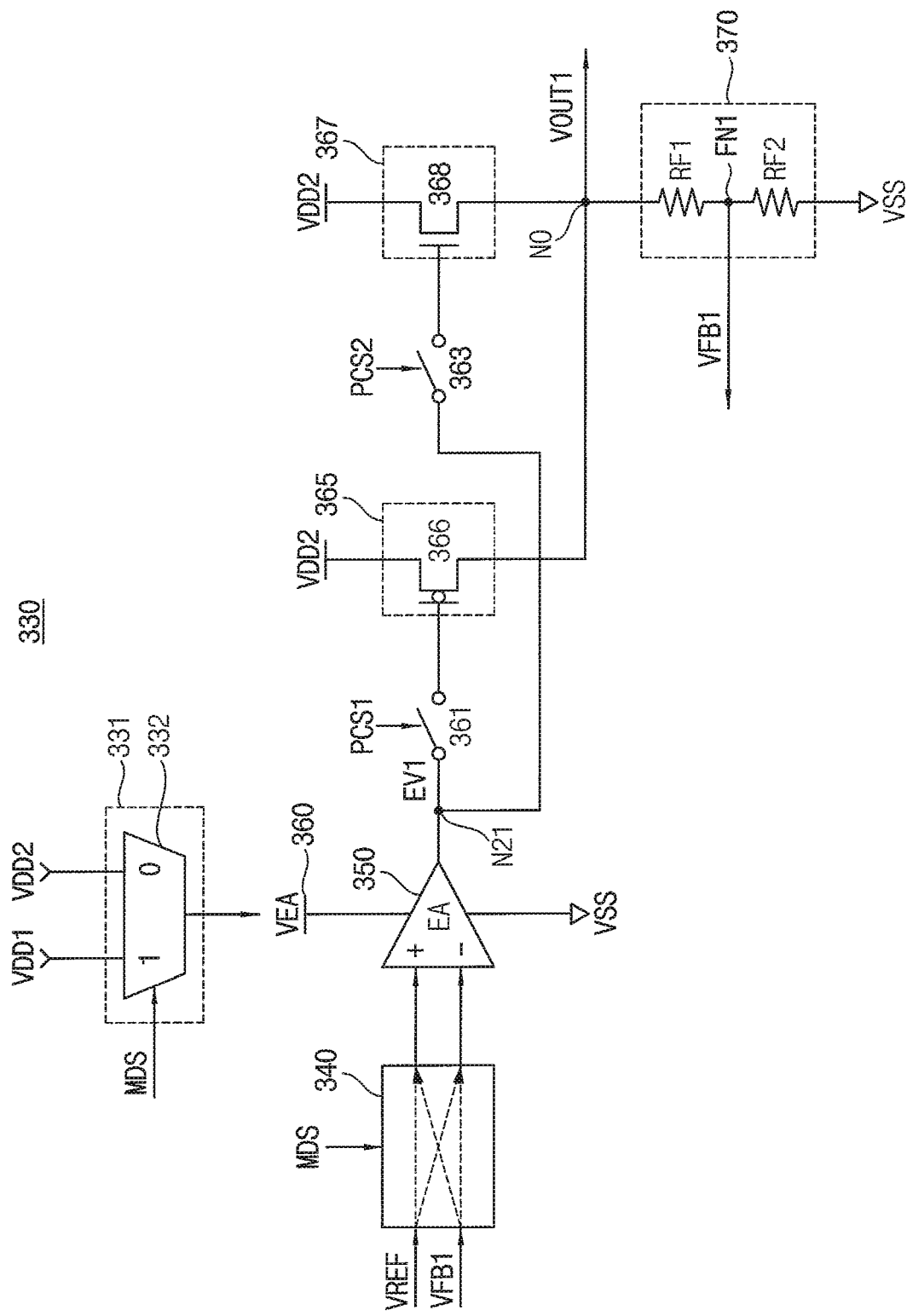
FIG. 11 is a circuit diagram illustrating the LDO regulator of FIG. 10 in detail according to example embodiments.

FIG. 11 is a circuit diagram illustrating the LDO regulator 330 of FIG. 10 in detail according to example embodiments.

Here, the voltage selector 331 may include a multiplexer 332. The multiplexer 332 may select the first driving voltage VDD1 among the first driving voltage VDD1 and the second driving voltage VDD2 to provide the error amplifier power supply voltage VEA based on the mode signal MDS in the contactless mode. The multiplexer 332 may select the second driving voltage VDD2 among the first driving voltage VDD1 and the second driving voltage VDD2 to provide the error amplifier power supply voltage VEA based on the mode signal MDS in the contact mode.

The polarity selector 340 may be implemented with a crossbar switch, may provide the reference voltage VREF and the feedback voltage VFB1 to the negative input terminal and the positive input terminal of the error amplifier 350, respectively, based on the mode signal MDS in the contact mode and may provide the reference voltage VREF and the feedback voltage VFB1 to the positive input terminal and the negative input terminal of the error amplifier 350, respectively, based on the mode signal MDS in the contactless mode.

The first power transistor 365 may be a PMOS transistor 366 having a source coupled to the second driving voltage VDD2, a gate coupled to the first power switch 361 and a drain coupled to the output node NO. The second power transistor 367 may be an NMOS transistor 368 having a source coupled to the second driving voltage VDD2, a gate coupled to the second power switch 363 and a source coupled to the output node NO.

In the contact mode, the first power switch 361 is turned-on in response to the first power switch control signal PCS1 to apply the first error voltage EV1 to the gate of the first power transistor 365 and the second power switch 363 is turned-off in response to the second power switch control signal PCS2 to disconnect the output terminal of the error amplifier 350 from the gate of the second power transistor 367.

In the contactless mode, the first power switch 361 is turned-off in response to the first power switch control signal PCS1 to disconnect the output terminal of the error amplifier 350 from the gate of the first power transistor 365 and the second power switch 363 is turned-on in response to the second power switch control signal PCS2 to apply the first error voltage EV1 to the gate of the second power transistor 367.

Figure 12:
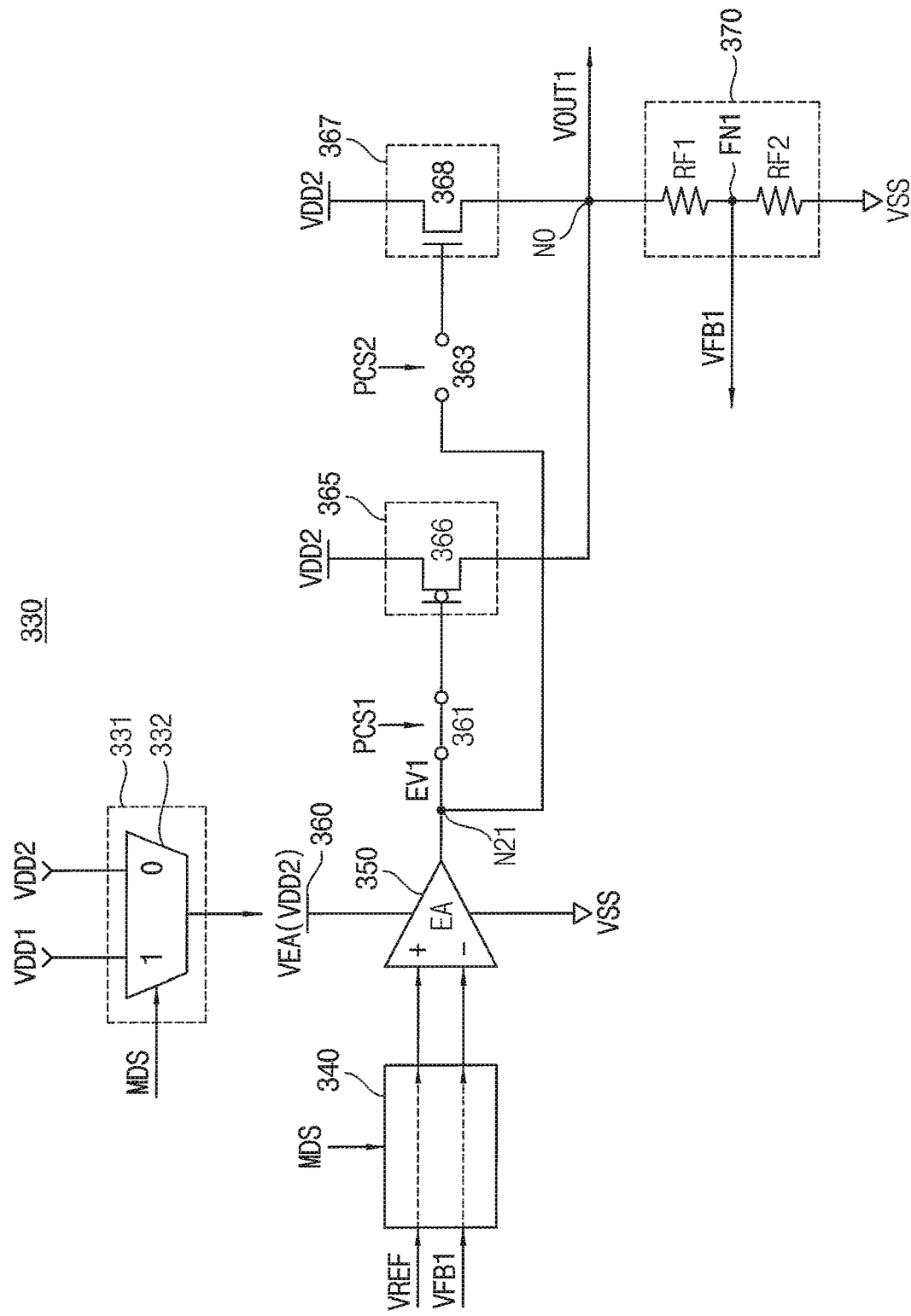
FIG. 12 illustrates an example operation of the LDO regulator of FIG. 11 in the contact mode according to example embodiments.

FIG. 12 illustrates an example operation of the LDO regulator of FIG. 11 in the contact mode according to example embodiments.

Referring to FIG. 12, the mode signal MDS has a second logic level (a low level) in the contact mode. The multiplexer 332 selects the second driving voltage VDD2 of the first driving voltage VDD1 and the second driving voltage VDD2 to provide the second driving voltage VDD2 to the power terminal 360 of the error amplifier 350 based on the mode signal MDS. The polarity selector 340 provides the reference voltage VREF and the feedback voltage VFB1 to the negative input terminal and the positive input terminal of the error amplifier 350, respectively, based on the mode signal MDS. The first power switch 361 is turned-on and the second power switch 363 is turned-off.

The error amplifier 350 is driven with the second driving voltage VDD2, amplifies a difference between the reference voltage VREF and the first feedback voltage VFB1 to applies the first error voltage EV1 to the gate of the first power transistor 365. The first power transistor 365 regulates the second driving voltage VDD2 based on the first error voltage EV1 to provide the first output voltage VOUT1 to the processor 240 and the logic circuit block 295 in FIG. 2.

When a voltage level of the first output voltage VOUT1 decreases in the contact mode, a voltage level of the first feedback voltage VFB1 decreases. A voltage level of the first error voltage EV1 decreases in response to the decrease of voltage level of the first feedback voltage VFB1. A current flowing from the first power transistor 365 to the output node NO increases in response to the decrease of the voltage level of the first error voltage EV1 and thus, the voltage level of the first output voltage VOUT1 increases.

When the voltage level of the first output voltage VOUT1 increases in the contact mode, the voltage level of the first feedback voltage VFB1 increases. The voltage level of the first error voltage EV1 increases in response to the increase of voltage level of the first feedback voltage VFB1. A current flowing from the first power transistor 365 to the output node NO decreases in response to the increase of the voltage level of the first error voltage EV1 and thus, the voltage level of the first output voltage VOUT1 decreases.

Therefore, in the contact mode, the first output voltage VOUT1 follows the reference voltage VREF by regulation operation of the first power transistor 365 which is implemented with the PMOS transistor 366.

Figure 13:
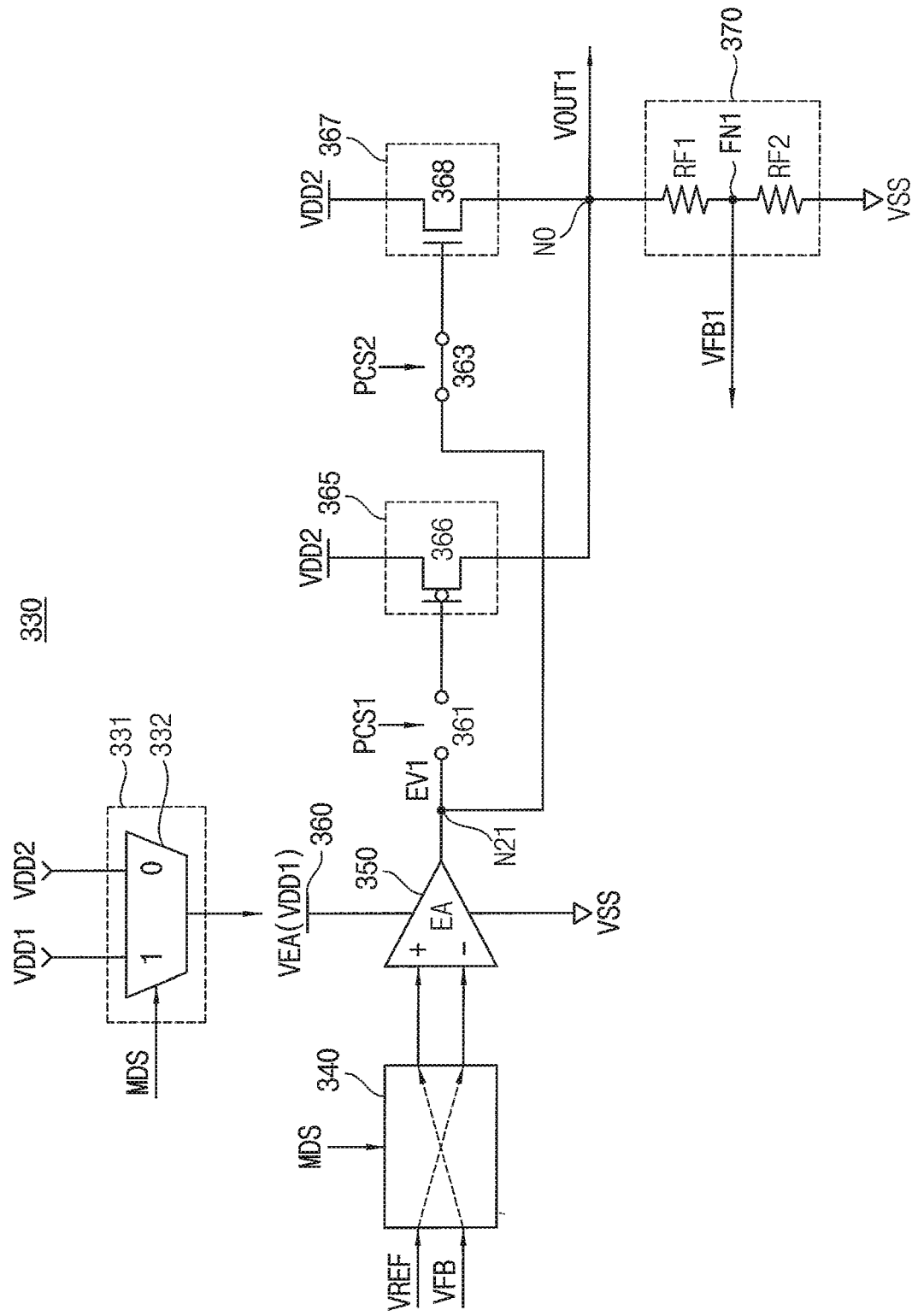
FIG. 13 illustrates an example operation of the LDO regulator of FIG. 11 in the contactless mode according to example embodiments.

FIG. 13 illustrates an example operation of the LDO regulator of FIG. 11 in the contactless mode according to example embodiments.

Referring to FIG. 13, the mode signal MDS has a first logic level (a high level) in the contact mode. The multiplexer 332 selects the first driving voltage VDD1 of the first driving voltage VDD1 and the second driving voltage VDD2 to provide the first driving voltage VDD1 to the power terminal 360 of the error amplifier 350 based on the mode signal MDS. The polarity selector 340 provides the reference voltage VREF and the feedback voltage VFB1 to the positive input terminal and the negative input terminal of the error amplifier 350, respectively, based on the mode signal MDS. The first power switch 361 is turned-off and the second power switch 363 is turned-on.

The error amplifier 350 is driven with the first driving voltage VDD1, amplifies a difference between the reference voltage VREF and the first feedback voltage VFB1 to applies the first error voltage EV1 to the gate of the second power transistor 367. The second power transistor 367 regulates the second driving voltage VDD2 based on the first error voltage EV1 to provide the first output voltage VOUT1 to the processor 240 and the logic circuit block 295 in FIG. 2.

When the voltage level of the first output voltage VOUT1 decreases in the contactless mode, the voltage level of the first feedback voltage VFB1 decreases. The voltage level of the first error voltage EV1 increases in response to the decrease of voltage level of the first feedback voltage VFB1. A current flowing from the first power transistor 365 to the output node NO increases in response to the decrease of the voltage level of the first error voltage EV1 and thus, the voltage level of the first output voltage VOUT1 increases.

When the voltage level of the first output voltage VOUT1 increases in the contactless mode, the voltage level of the first feedback voltage VFB1 increases. The voltage level of the first error voltage EV1 decreases in response to the increase of voltage level of the first feedback voltage VFB1. A current flowing from the first power transistor 365 to the output node NO decreases in response to the decrease of the voltage level of the first error voltage EV1 and thus, the voltage level of the first output voltage VOUT1 decreases.

Therefore, in the contactless mode, the first output voltage VOUT1 follows the reference voltage VREF by regulation operation of the second power transistor 367 which is implemented with the NMOS transistor 368.

That is, the error amplifier 350 is driven with the second driving voltage VDD2 to apply the first error voltage EV1 to the gate of the PMOS transistor 366 in the contact mode and the error amplifier 350 is driven with the first driving voltage VDD1 to apply the first error voltage EV1 to the gate of the NMOS transistor 368 in the contactless mode. Therefore, a gate-drain voltage of the PMOS transistor 366 is different from a gate-source voltage of the NMOS transistor 368.

In a conventional internal voltage generator, an error amplifier is driven with a second driving voltage VDD2 and a PMOS type power transistor regulates the second driving voltage VDD2 to provide the first output voltage VOUT2 to the logic circuit block 295. Therefore, since a difference between the second driving voltage VDD2 and the first output voltage VOUT1 is small and a drain-source voltage of the PMOS transistor is too small, the first output voltage VOUT1 may not have a stable level.

The LDO regulator 330 according to example embodiments, drives the error amplifier 350 with the first driving voltage VDD1 which is larger than the second driving voltage VDD2, and the second power transistor 367 implemented with the NMOS transistor 368 regulates the second driving voltage VDD2 based on the first error voltage EV1 to provide the first output voltage VOUT1. Therefore, a gate-source voltage of the NMOS transistor 368 is enough, and thus the first output voltage VOUT1 may have a stable level.

Figure 14:
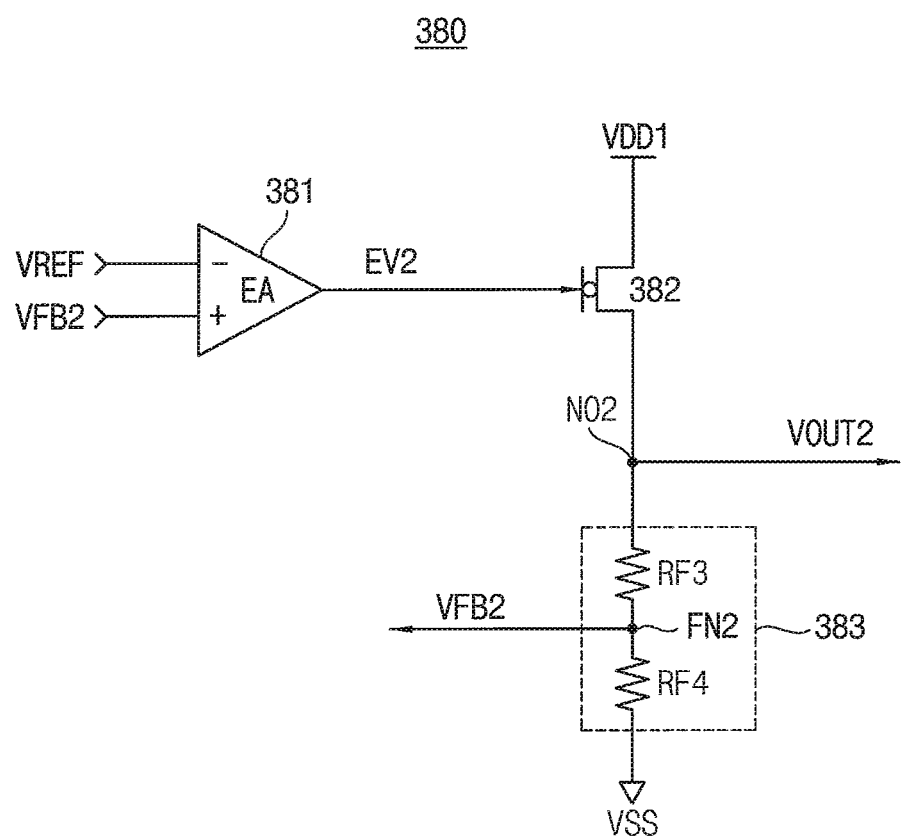
FIG. 14 is a circuit diagram illustrating an example of the voltage regulator in the internal voltage generator of FIG. 5 according to example embodiments.

FIG. 14 is a circuit diagram illustrating an example of the voltage regulator in the internal voltage generator of FIG. 5 according to example embodiments.

Referring to FIG. 14, the voltage regulator 380 may include an error amplifier 381, a power transistor 382 and a feedback circuit 383.

The error amplifier 381 may have a negative (−) input terminal to receive the reference voltage VREF and a positive (+) input terminal to receive a second feedback voltage VFB2. The error amplifier 381 may amplify a difference between the second feedback voltage VFB2 and the reference voltage VREF to output a second error voltage EV2 to a gate of the power transistor 382.

The power transistor 382 may be a PMOS transistor having a source coupled to the first driving voltage VDD1, a gate to receive the second error voltage EV2 and a drain coupled to an output node NO2, and may regulate the first driving voltage VDD1 based on the second error voltage EV2 to provide the second output voltage VOUT2 at the output node NO2.

The feedback circuit 383 is connected between the output node NO2 and the ground voltage VSS, and may divide the second output voltage VOUT2 to provide the second feedback voltage VFB2. The feedback circuit 383 includes a feedback resistor RF3 and a feedback resistor RF4 connected in series between the output node NO2 and the ground voltage VSS. The feedback resistor RF3 and the feedback resistor RF4 are connected to each other at a feedback node FN2, and the feedback circuit 383 provides a voltage of the feedback node FN2 as the second feedback voltage VFB2.

In the voltage regulator 380, the power transistor 382 implemented with the PMOS transistor regulates the first driving voltage VDD1 to provide the second output voltage VOUT2, and thus a voltage level of the second output voltage VOUT2 is equal to or greater than the first output voltage VOUT1. The voltage regulator 380 may provide the second output voltage VOUT2 to the fingerprint recognition sensor 270 and the LEDs 290 in FIG. 2. Since the fingerprint recognition sensor 270 and the LEDs 290 are used for performing fingerprint authentication on the payment data in the contactless mode, and thus a power consumption in the smart card 50 increases. The fingerprint recognition sensor 270 and the LEDs 290 operate based on the second output voltage VOUT2 having a relatively high voltage level, and thus the fingerprint recognition sensor 270 and the LEDs 290 operate stably.

Figure 15:
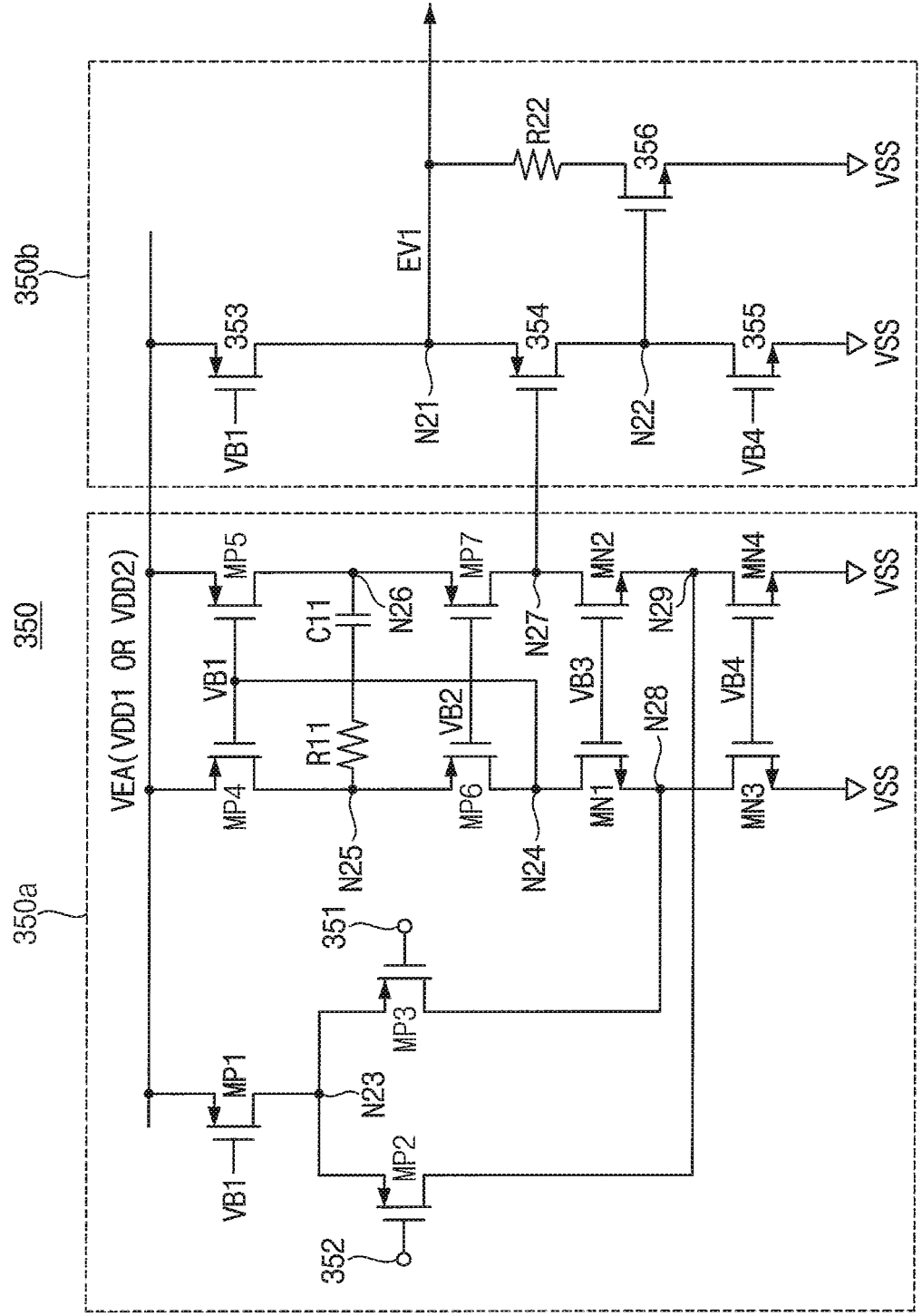
FIG. 15 is a circuit diagram illustrating an example of the error amplifier in the LDO regulator of FIG. 10 in detail according to example embodiments.

FIG. 15 is a circuit diagram illustrating an example of the error amplifier in the LDO regulator of FIG. 10 in detail according to example embodiments. In this example, the error amplifier 350 may include a folded cascode amplifier 350a and a source follower 350b.

The folded cascode amplifier 350a may include PMOS transistors MP1~MP7, NMOS transistors MN1~MN4, a resistor R11 and a capacitor C11.

The PMOS transistor MP1 is connected between the power voltage EVA and a node N23 and has a gate receiving a first bias voltage VB1. Therefore, the PMOS transistor MP1 may operate as a current source. The PMOS transistor MP2 is connected between a node N23 and a node N28 and has a gate coupled to a negative input terminal 351. The PMOS transistor MP3 is connected between the node N23 and a node N29 and has a gate coupled to a positive input terminal 352.

The PMOS transistor MP4 is connected between the power voltage EVA and a node N25 and has a gate receiving the first bias voltage VB1. The PMOS transistor MP5 is connected between the power voltage EVA and a node N26 and has a gate receiving the first bias voltage VB1. The resistor R11 and the capacitor C11 are connected in series between the node N25 and the node N26. The PMOS transistor MP6 is connected between the node N25 and a node N24 and has a gate receiving a second bias voltage VB2. The PMOS transistor MP6 is connected between the node N26 and a node N27 and has a gate receiving the second bias voltage VB2.

The NMOS transistor MN1 is connected between the node N24 and a node N28 and has a gate receiving a third bias voltage VB3. The NMOS transistor MN2 is connected between the node N27 and a node N29 and has a gate receiving the third bias voltage VB3. The NMOS transistor MN3 is connected between the node N28 and the ground voltage VSS and has a gate receiving a fourth bias voltage VB4. The NMOS transistor MN4 is connected between the node N2 and the ground voltage VSS and has a gate receiving a fourth bias voltage VB4.

The source follower 350b may include PMOS transistors 353 and 354, NMOS transistors 355 and 356 and a resistor R22.

The PMOS transistor 353 is connected between the power voltage EVA and a node N21 and has a gate receiving the first bias voltage VB1. The PMOS transistor 354 is connected between the node N21 and a node N22 and has a gate coupled to the node N27. The resistor R22 is connected between the node N21 and the NMOS transistor 356. The NMOS transistor 355 is connected between the node N22 and the ground voltage VSS and has a gate receiving the fourth bias voltage VB4. The NMOS transistor 356 is connected between the resistor R22 and the ground voltage VSS and has a gate coupled to the node N22.

In FIG. 15, it is assumed that a current driving capability of the PMOS transistors MP1, MP4, MP5 and 353 may be same with respect to each other, a current driving capability of the PMOS transistors MP2 and MP3 may be same with respect to each other, a current driving capability of the PMOS transistors MP6, MP7 and 354 may be same with respect to each other, a current driving capability of the NMOS transistors MN1, MN2 and 356 may be the same with respect to each other, and current driving capability of the NMOS transistors MN1, MN2 and 356 may be the same with respect to each other.

The first bias voltage VB1 is applied to each gate of the PMOS transistors MP1 and 353 and thus, a current having a same magnitude flows into the nodes N23 and N21. A difference between the reference voltage applied to the negative input terminal 351 and the first feedback voltage VFB1 applied to the positive input terminal 352 makes a voltage difference at the nodes N27 and N24, and the first error voltage EV1 corresponding to the voltage difference at the nodes N27 and N24 is provided at the node N21.

In general, the smart cards or the IC cards are of a shape such that a thin semiconductor device is attached to a plastic card of the same size as a credit card. The smart cards can be roughly classified as a contact IC card, a contactless IC Card (CICC), and a Remote Coupling Communication Card (RCCC). In connection with the CICC, ISO (the International Organization for Standardization) and IEC (the International Electrotechnical Commission) have formed a specialized system for worldwide standardization.

In particular, international standard ISO/IEC 14443 specifies the physical characteristics of proximity cards, radio frequency power and signal interface, initialization and anti-collision, and transmission protocol. Under ISO/IEC 14443, the contactless IC cards incorporate an integrated circuit (IC) that performs data processing and/or memory functionality. The possibility of contactless card technology is a result of the achievement of signal exchange via inductive coupling with a proximity coupling device (that is, a card reader) and to ability to supply power to the card without the use of galvanic elements (i.e., the absence of an ohmic path from the external interfacing equipment to the integrated circuit(s) contained within the card). A card reader produces an energizing radio frequency (RF) field which is coupled to the card to transfer power and which is modulated for communication. The carrier frequency fc of the RF operating field is 13.56 MHz+7 kHZ.

Figure 16:
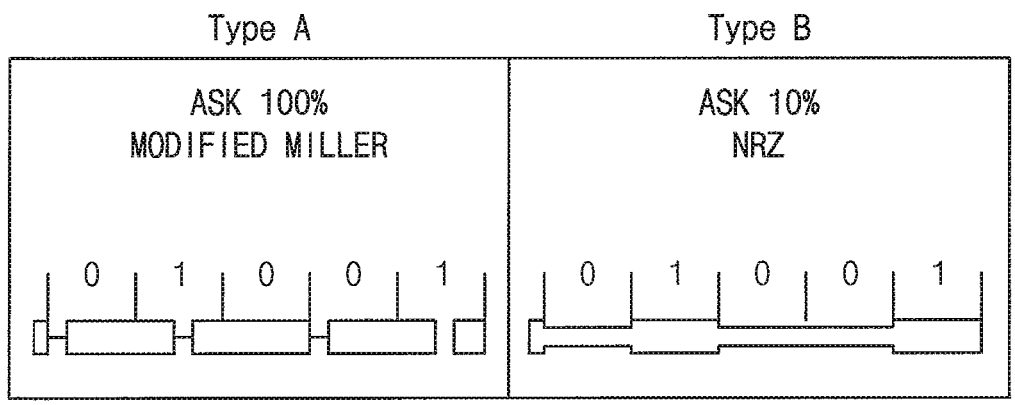
FIGS. 16 and 17 are diagrams illustrating examples of communication signals for a type A interface of ISO/IEC 14442 standards.
Figure 17:
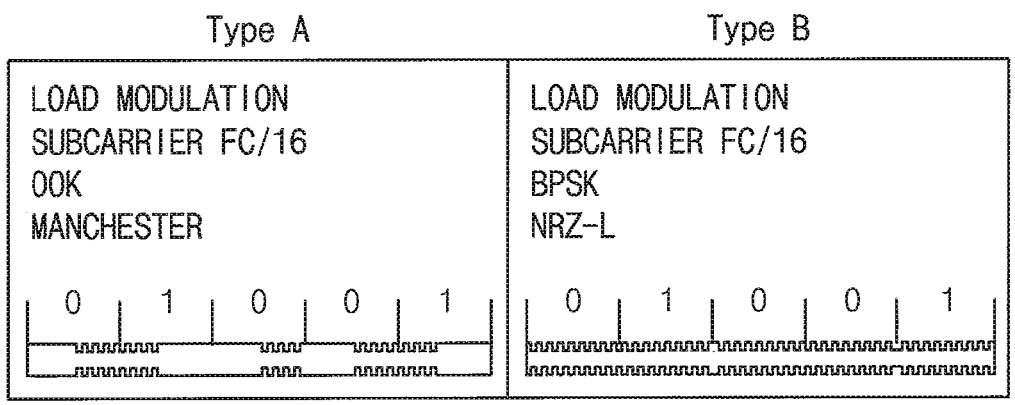
Figures 18, 19:
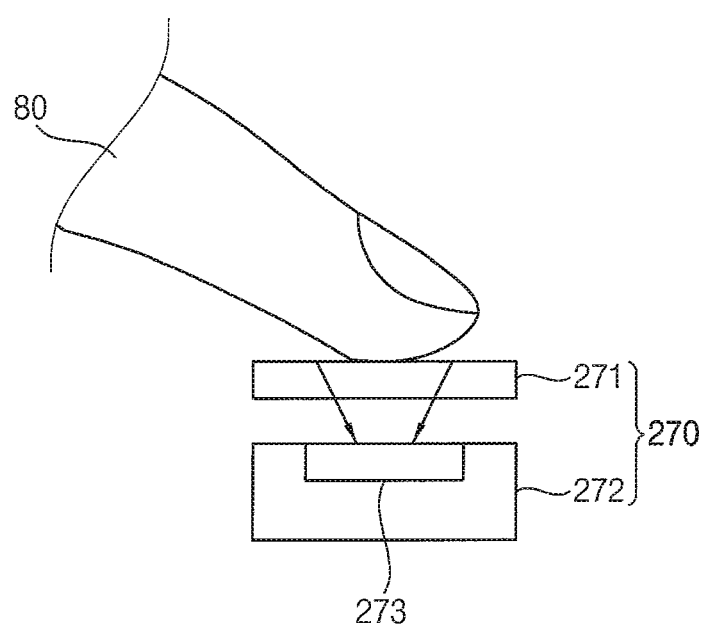
FIG. 18 is a diagram illustrating an example of frames and pauses of the type A interface of ISO/IEC 14442 standards.
FIG. 19 illustrates an example of the fingerprint recognition sensor in the smart card chip in FIG. 2 according to example embodiments.

FIGS. 16 and 17 are diagrams illustrating examples of communication signals for a type A interface of ISO/IEC 14442 standards, and FIG. 18 is a diagram illustrating an example of frames and pauses of the type A interface of ISO/IEC 14442 standards.

FIG. 16 illustrates a signal transferred from a card reader to a contactless IC card and FIG. 17 illustrates a signal transferred from the contactless IC card to the card reader.

The ISO/IEC 14443 protocol describes two communication signal interfaces, Type A and Type B. Under the communication signal interface Type A, communication from a card reader to a contactless smart card utilizes the modulation principle of ASK 100% of the RF operating field and a Modified Miller code principle. The bit rate for the transmission from the card reader to the contactless smart card is fc/128, that is, 106 kbps (kb/s). Transmission from the contactless smart card to the card reader is coded by the Manchester code principle and then modulated by the On-Off Key (OOK) principle. Presently, cards that are managed by the communication signal interface of Type A in subways and buses, generate timing of a constant interval of time using an ASK-modulated signal received from a card reader, and receive and transmit data one bit at a time.

When data is transferred from a smart card to a card reader, power is stably provided to the smart card from the card reader.

FIG. 18 illustrates Type A data frames of ISO/IEC 14443 standards. FIG. 18 shows a short frame including a start bit S, data bits b1~B7 and an end bit E.

FIG. 19 illustrates an example of the fingerprint recognition sensor in the smart card chip in FIG. 2 according to example embodiments.

Referring to FIG. 19, the fingerprint recognition sensor 270 may include a lens 271 and a an image sensor 272, and the image sensor 272 may include a pixel array 273.

The lens 271 may concentrate reflected light from a user's finger 80 on the pixel array 272 of the image sensor 272. The image sensor 272 may generate a fingerprint image signal based on the reflected light and may provide the fingerprint image signal to the processor 240 in FIG. 2.

The processor 240 may compare the fingerprint image signal with the user's original fingerprint and may determine whether the user's input fingerprint is faked based on a result of the comparison. When the processor 240 determines that the user's input fingerprint matches the user's original fingerprint, the processor 240 may indicate that the user authentication is passed by controlling the LEDs 295 to emit light while performing the user authentication on the payment data associated with the payment operation.

Figure 20:
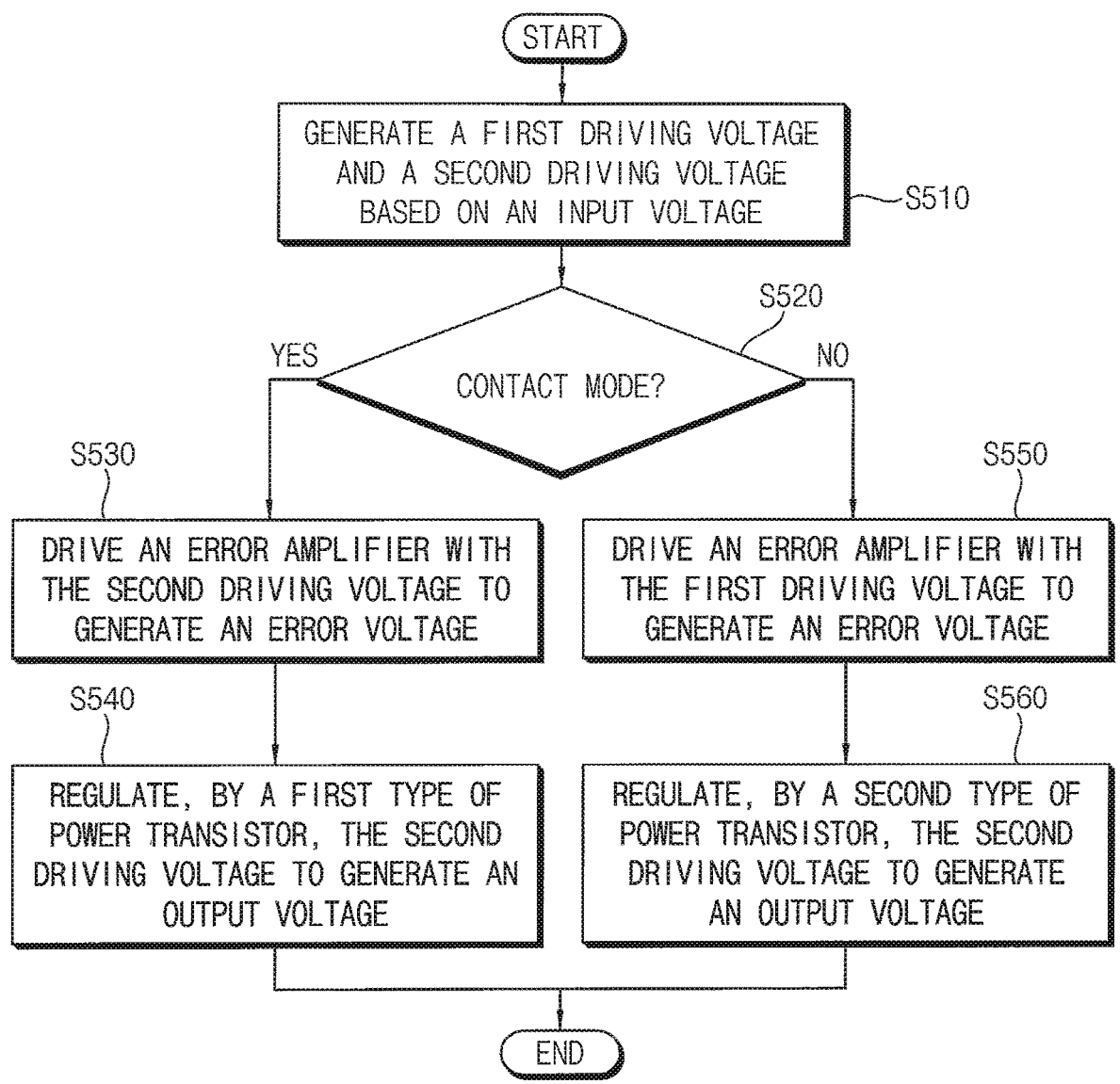
FIG. 20 is a flow chart illustrating a method of operating a smart card according to example embodiments.

FIG. 20 is a flow chart illustrating a method of operating a smart card according to example embodiments.

Referring to FIG. 1 through 20, the switched capacitor circuit 305 in the internal voltage generator 300 of the smart card 50 generates the first driving voltage VDD1 and the second driving voltage VDD2, where VDD2 is smaller than VDD1, based on the input voltage VDD1 (operation S510). The switched capacitor circuit 305 may receive a rectified voltage VREC obtained by rectifying the input voltage and may generate the first driving voltage VDD1 and the second driving voltage VDD2 by converting the rectified voltage VREC.

The mode detector 260 in the smart card 50 determines whether the smart card 50 receives the input voltage VIN in the contact mode (operation S520), and generates the mode signal MDS indicating one of the contact mode and the contactless mode.

When the smart card 50 receives the input voltage VIN in the contact mode (YES in S520), the LDO regulator 330 drives the error amplifier 350 with the second driving voltage VDD2 to generate the first error voltage EV1 (operation S530). The first power transistor 365 implemented with the PMOS transistor 366 regulates the second driving voltage VDD2 based on the first error voltage EV1 to provide the first output voltage VOUT1 (operation S540).

When the smart card 50 receives the input voltage VIN in the contactless mode (NO in S520), the LDO regulator 330 drives the error amplifier 350 with the first driving voltage VDD1 to generate the first error voltage EV1 (operation S550). The second power transistor 367 implemented with the NMOS transistor 368 regulates the second driving voltage VDD2 based on the first error voltage EV1 to provide the first output voltage VOUT1 (operation S560).

Therefore, in a method of operating the smart card according to example embodiments, the LDO regulator 330 drives the error amplifier 350 with the second driving voltage VDD2 and the first driving voltage VDD1 having different voltage levels, respectively in the contact mode and the contactless mode, the first power transistor 365 implemented with the PMOS transistor 366 regulates the second driving voltage VDD2 based on the first error voltage EV1 to provide the first output voltage VOUT1 in the contact mode and the second power transistor 367 implemented with the NMOS transistor 368 regulates the second driving voltage VDD2 based on the first error voltage EV1 to provide the first output voltage VOUT1 in the contactless mode. Accordingly, the LDO regulator 330 may provide the first output voltage VOUT1 to the logic circuit block 290 stably in both the contact mode and the contactless mode.

Figure 21:
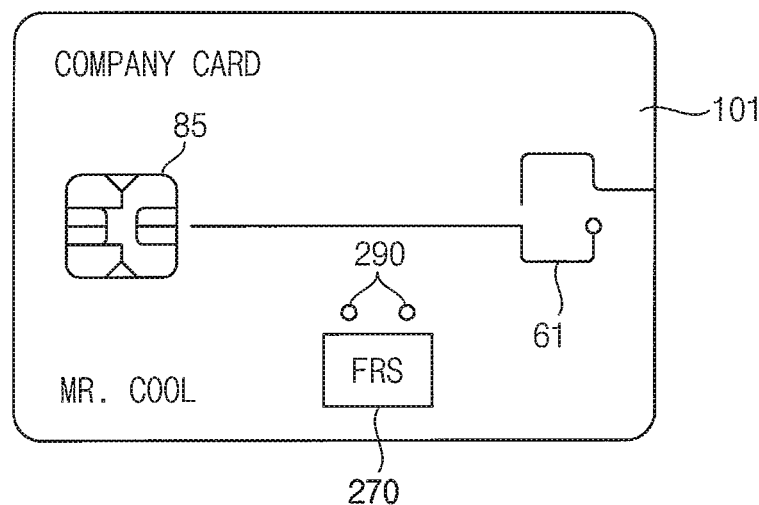
FIG. 21 illustrates an example of the smart card according to example embodiments.

FIG. 21 illustrates an example of the smart card according to example embodiments. In this example, the smart card 50 may include an integrated circuit 85, an antenna 61, the fingerprint recognition sensor 270 and the LEDs 290 formed in a substrate 101.

The antenna 61 may be coupled to the integrated circuit 85. The integrated circuit 85 may include components among from components of the smart card chip 100 in FIG. 2 except the fingerprint recognition sensor 270 and the LEDs 290, and the contact terminal 63 in FIG. 1 may be included in the integrated circuit 85.

Figure 22:
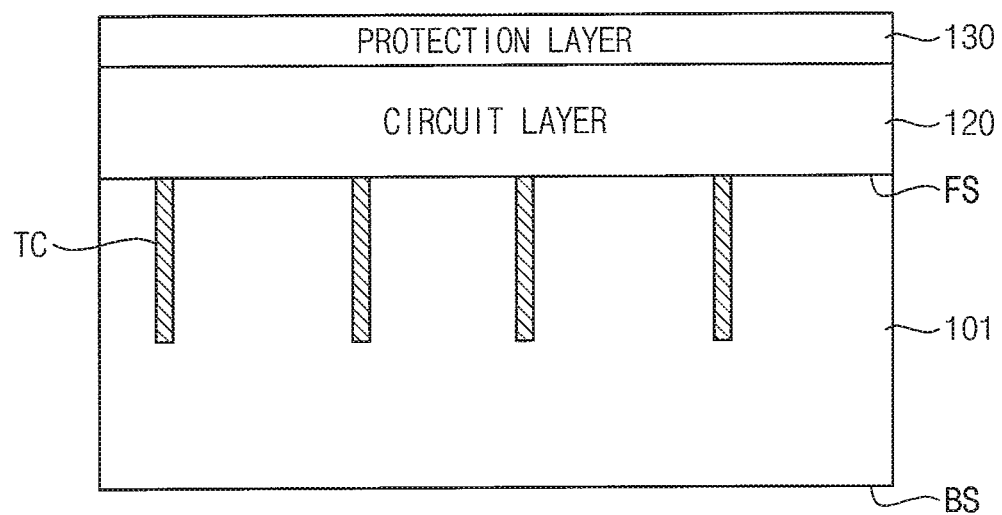
FIG. 22 is a cross-sectional view illustrating an example of the smart card according to example embodiments.

FIG. 22 is a cross-sectional view illustrating an example of a structure of the smart card according to example embodiments. The smart card 50 may include substrate 101, a plurality of trench capacitors TC arranged in the substrate 101, a circuit layer 120 disposed at a front side FS of the substrate 101 and a protection layer 130 disposed on an upper portion of the circuit layer 120. In example embodiments, the protection layer 130 may be provided as an active shield. The protection layer 130 may include a plurality of wires arranged on the circuit layer 120 and an insulating layer on the plurality of wires.

Figure 23:
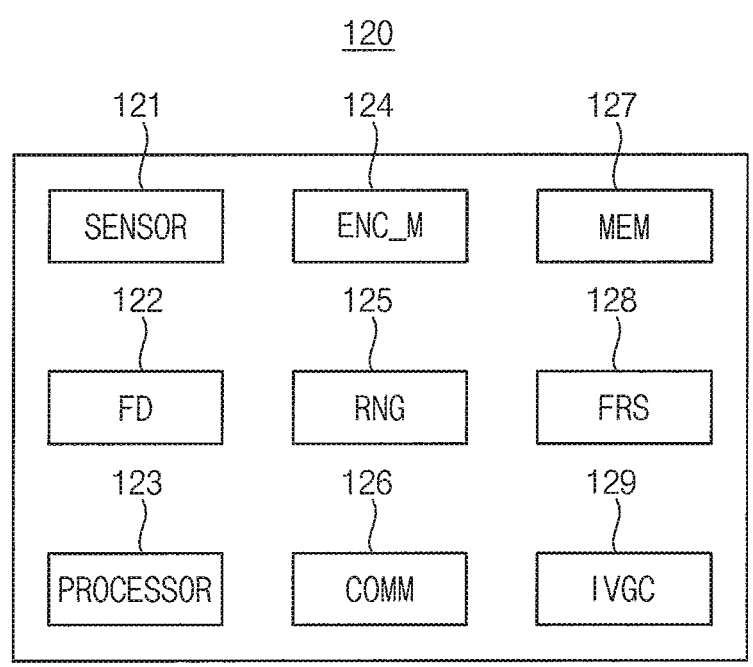
FIG. 23 is a block diagram illustrating an example of the circuit layer in the smart card in FIG. 22 according to example embodiments.

FIG. 23 is a block diagram illustrating an example of the circuit layer in the smart card in FIG. 22 according to example embodiments. The circuit layer 120 may include a sensor 121, a frequency detector (FD) 122, a processor 123, a cryptography module (ENC_M) 124, a random number generator (RNG) 125, a communication module (COMM) 126, a memory (MEM) 127, a fingerprint recognition sensor (FSR) 128 and an internal voltage generator (IVGC) 129.

The processor 123, the memory 127, the fingerprint recognition sensor 128 and the internal voltage generator 129 may respectively correspond the processor 240, the memory 250, the fingerprint recognition sensor 270 and the internal voltage generator 300 in FIG. 2 and the cryptography module 124, the random number generator 125, and the communication module 126 may correspond to the logic circuit block 295 in FIG. 2.

Referring to FIGS. 22 and 23, the sensor 121 may include a plurality of trench capacitors TC. When a lower area of a trench capacitors TC is removed, in the course of back side polishing, the capacitance of the affected trench capacitor TC may change. (Back side polishing is a malicious attack in which the back side of a chip is polished to access a target transistor(s).)

The frequency detector 122 may be connected to an output terminal of the sensor 121 and detect a frequency of an output signal of the sensor 121. When the detected frequency of the output signal is outside a predetermined range, the frequency detector 122 may activate an alarm signal, by generating a logic "high" control signal, for example, and provide the generated control signal to the processor 123.

For example, if a logic "high" control signal is received from the frequency detector 122, the processor 123 may nullify data stored in the memory 127 in the smart card 50, or initialize functions of the cryptography module 124 or the random number generator 125 in the smart card 50. In this manner, the smart card 50 may be reset, and security information may be protected from a back side attack.

Figure 24:
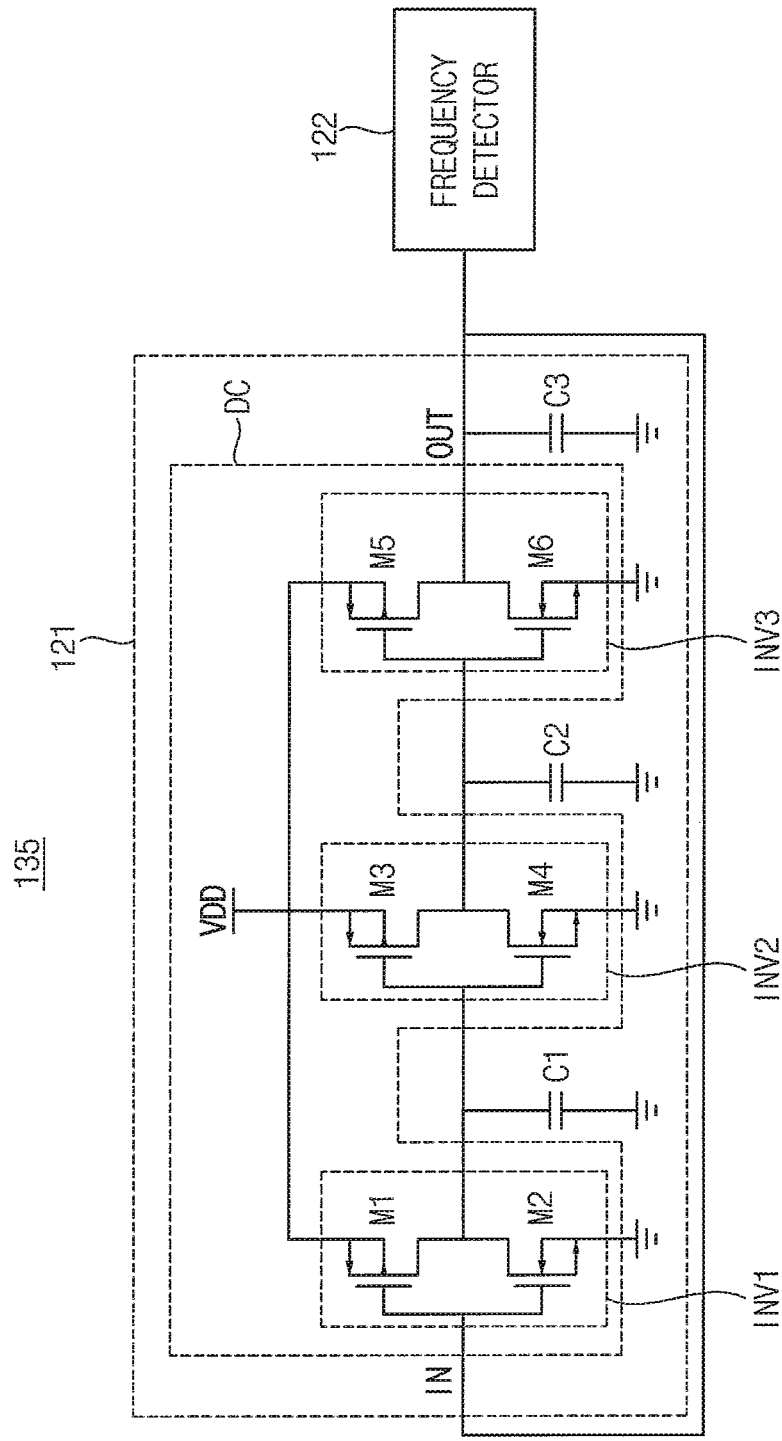
FIG. 24 is a circuit diagram illustrating an example of a protection device according to example embodiments.

FIG. 24 is a circuit diagram illustrating an example of a protection device, 135, according to example embodiments. The protection device 135 may be employed to protect smart card 50 from a back side attack.

The protection device 135 may protect the smart card 50 from a back side attack to prevent leakage, interception, or theft of important information such as secret data or cryptographic keys stored in a memory (not shown) disposed at a front side of the smart card 50.

Referring to FIG. 24, the protection device 135 may include a sensor 121 and a frequency detector 122. The sensor 121 may include first to third capacitors C1 to C3. According to an embodiment, at least one capacitor selected from the first to third capacitors C1 to C3 may be a trench capacitor formed in a substrate. Accordingly, when the back side polishing is performed during a back side attack, a lower area of the trench capacitor is removed, and thus, capacitance of the trench capacitor is changed.

The sensor 121 may also include a detecting circuit DC that detects changes in capacitance of the first to third capacitors C1 to C3. According to an embodiment, the detecting circuit DC may be a ring oscillator that includes first, second, and third PMOS transistors M3, and M5 and first, second, and third NMOS transistors M2, M4, and M6. The first PMOS transistor M1 and the first NMOS transistor M2 may form a first inverter INV1, the second PMOS transistor M3 and the second NMOS transistor M4 may form a second inverter INV2, and the third PMOS transistor M5 and the third NMOS transistor M6 may form a third inverter INV3.

Accordingly, the sensor 121 may be a ring oscillator that includes first to third inverters INV1 to INV3 that are connected in series and first to third capacitors C1 to C3, that is, a multi-stage ring oscillator. Feedback related to the voltage of an output terminal OUT of the ring oscillator is transmitted to an input terminal IN.

The first capacitor C1 may be connected to an output terminal of the first inverter INV1, the second capacitor C2 may be connected to an output terminal of the second inverter INV2, and the third capacitor C3 may be connected to an output terminal of the third inverter INV3. Although not illustrated, a first resistor may be connected between the first inverter INV1 and the first capacitor C1, a second resistor may be connected between the second inverter INV2 and the second capacitor C2, and a third resistor may be connected between the third inverter INV3 and the third capacitor C3.

The frequency detector 122 may be connected to the output terminal OUT of the sensor 121 to detect the frequency of an output signal of the sensor 121. In operation, a lower area of at least one selected from the first to third capacitors C1 to C3 may be removed due to the back side polishing that is performed during the back side attack, and as a result, the capacitance of at least one selected from the first to third capacitors C1 to C3 may be changed.

When capacitance decreases, for example, the frequency of an output signal output from the sensor 121 may increase. In embodiments, the frequency detector 122 may detect a change in capacitance by detecting a frequency, or change in frequency, of an output signal OUT from the terminal of the same name.

For example, when the frequency of output signal OUT, detected by the frequency detector 122, is outside a predefined range, a control signal may be provided to the processor 123 in FIG. 23. In an embodiment, the frequency detector 122 may generate a logic "low" control signal when the detected frequency is within the predefined range, and may generate a logic "high" control signal when the detected frequency is outside the predefined range. The frequency detector 122 may provide a generated control signal to the processor 123. For example, when the predefined range is set to about 14 MHz to about 26 MHz and a detected frequency is greater than 26 MHz, the frequency detector 122 may generate a logic "high" control signal and provide the generated control signal to the processor 123.

When the processor 123 receives the logic "high" control signal from the frequency detector 122, the processor 123 may nullify data stored in the memory 127 or initialize a function of the cryptography module 124. In embodiments, the smart card 50 may be reset, and security information may be protected from a back side attack, in response to activation of the frequency detector signal, which, in turn, may reflect a change in capacitance in a ring oscillator.

Figure 25A:
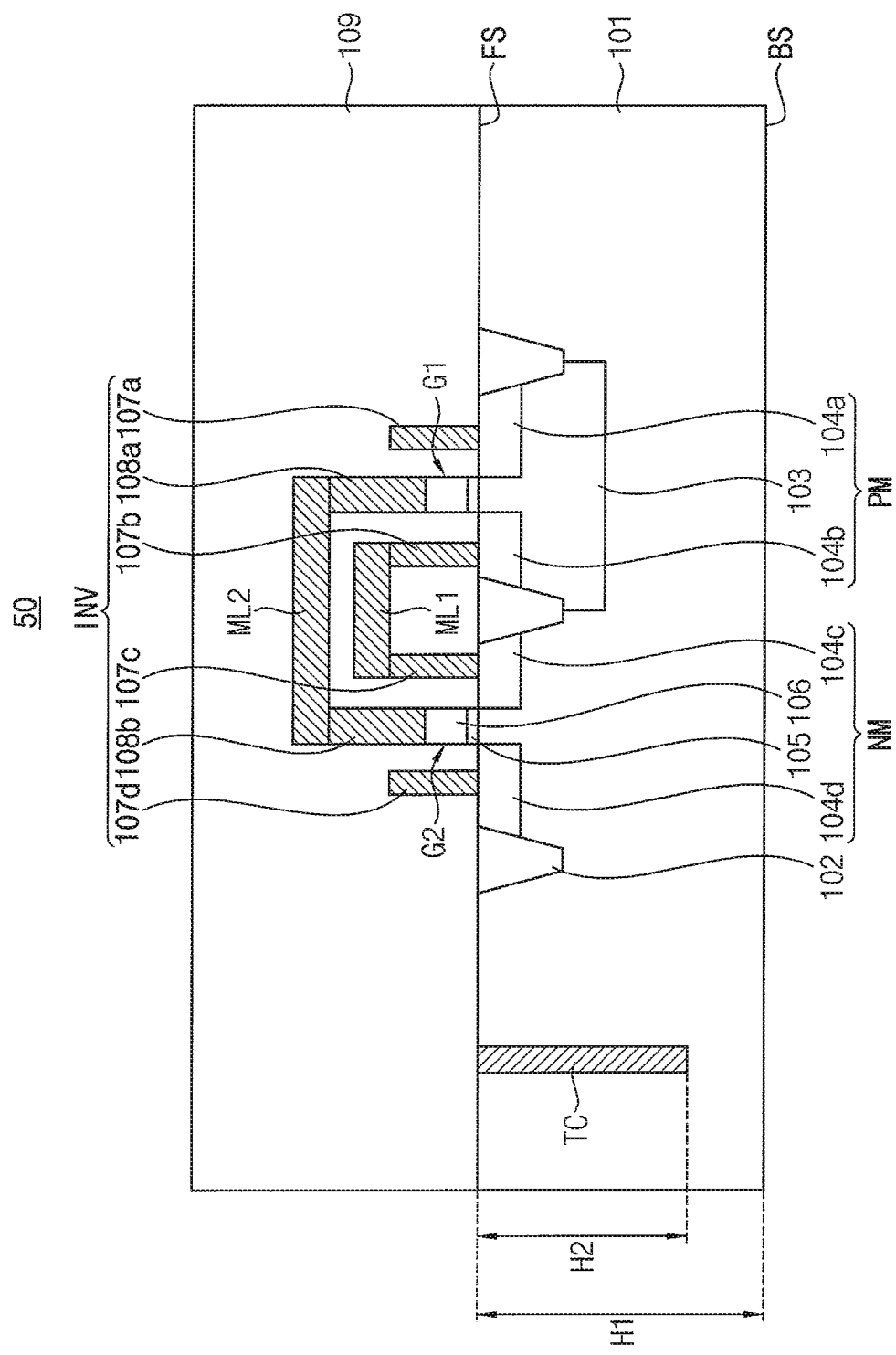
FIG. 25A is a cross-sectional view illustrating a smart card that includes a portion of a sensor according to example embodiments.

FIG. 25A is a cross-sectional view illustrating a structure of a smart card that includes a portion of a sensor according to example embodiments. The smart card 50 includes a substrate 101, a trench capacitor TC in the substrate 101, and an inverter INV at a front side FS of the substrate 101. According to this embodiment, the trench capacitor TC may be one selected from the first to third capacitors C1 to C3 shown in FIG. 24, and the inverter INV may be one selected from the first to third inverters INV1 to INV3 shown in FIG. 24.

The substrate 101 may be a semiconductor substrate that has a first height H1 between the front side FS and a back side BS, and may include one selected from, for example, silicon, silicon-on-insulator (SOI), silicon-on-sapphire, germanium, silicon germanium, and gallium arsenide. For example, the substrate 101 may be a P-type semiconductor substrate. An isolation layer 102, which defines a plurality of active areas, is disposed in the substrate 101. The isolation layer 102 may be provided by performing, for example, a Shallow Trench Isolation (STI) process. An n-type well 103 may be disposed in a portion of the substrate 101.

The trench capacitor TC is disposed in the substrate 101 and has a second height H2 from the front side FS of the substrate 101. The second height H2 is smaller than the first height H1. According to an embodiment, the second height H2 may be modified due to back side polishing, such as may be performed for a back side attack.

A first gate G1, and a source 104*a* and a drain 104*b* disposed at both sides of the first gate G1 may form a PMOS transistor PM. A second gate G2, and a drain 104*c* and a source 104*d* disposed at both sides of the second gate G2 may form an NMOS transistor NM. Each of the first and second gates G1 and G2 may include a gate insulating layer 105 and a gate electrode 106.

A first source contact 107*a* may be disposed on the source 104*a* of the PMOS transistor PM, and a power voltage VDD may be applied to the first source contact 107*a*. A first drain contact 107*b* may be disposed on the drain 104*b* of the PMOS transistor PM, a second drain contact 107*c* may be disposed on the drain 104*b* of the NMOS transistor NM, and the first and second drain contacts 107*a* and 107*b* may be electrically connected to each other via a first conductive line ML1. A second source contact 107*d* may be disposed on the source 104*d* of the NMOS transistor NM. The second source contact 107*d* may be grounded.

A first gate contact 108*a* may be disposed on the first gate G1, a second gate contact 108*b* may be disposed on the second gate G2, and the first and second gate contacts 108*a* and 108*b* may be electrically connected to each other via a second conductive line ML2. However, the above-described structure of the inverter INV is only an example, and may be modified in various ways in other embodiments.

Figure 25B:
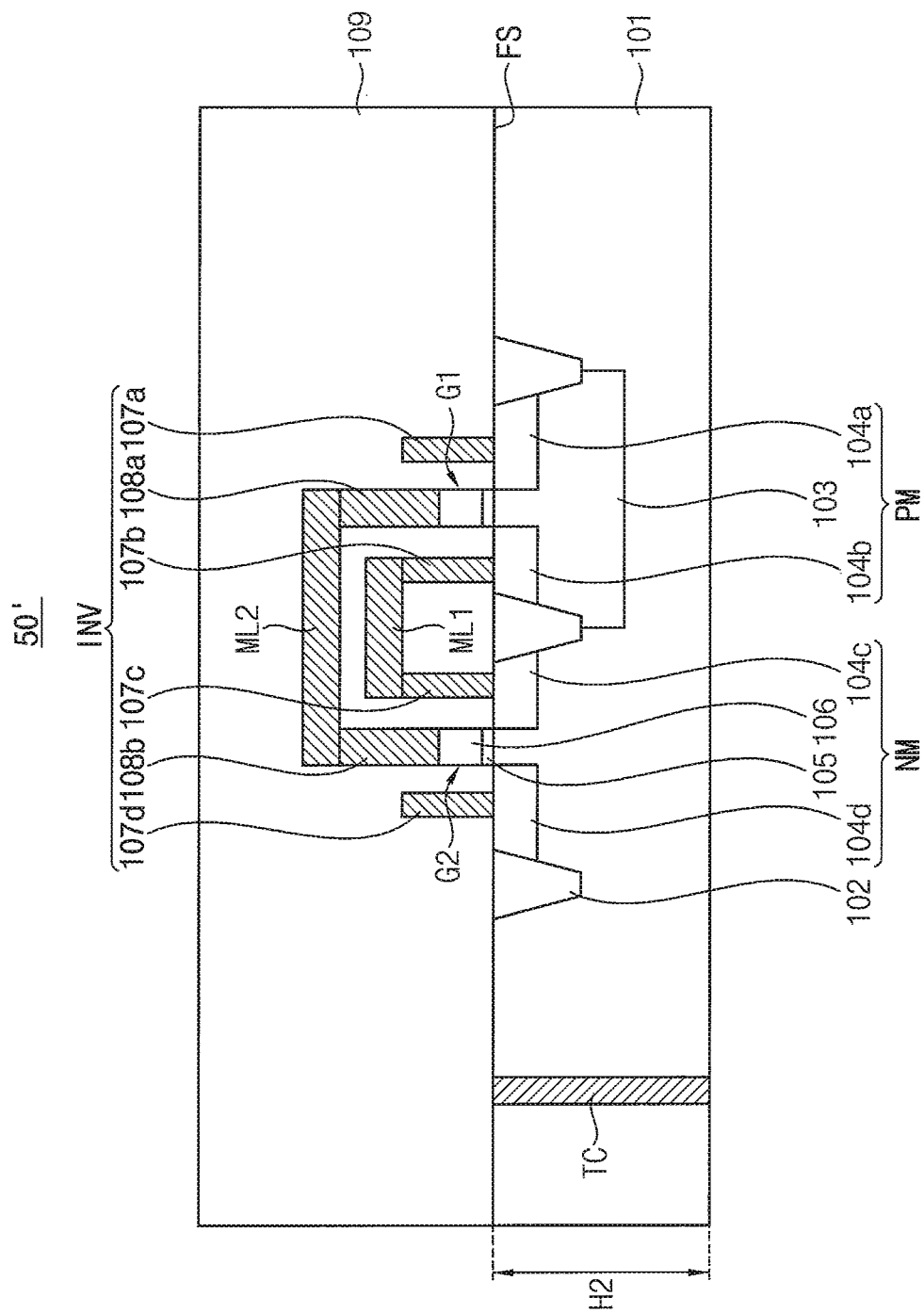
FIG. 25B is a cross-sectional view illustrating a smart card which includes a portion of a sensor, according to example embodiments, and upon which backside polishing may be performed in the course of a back side attack.

FIG. 25B is a cross-sectional view illustrating a smart card which includes a portion of a sensor, according to example embodiments, and upon which "back side polishing" may be performed in the course of a back side attack. When back side polishing is performed during a back side attack for a smart card 50', a predetermined depth may be removed from a back side of the substrate 101. Accordingly, a lower end of a trench capacitor TC may be cut. In this case, a second height H2' of the trench capacitor TC may be changed. As a result, as the dielectric material of the trench capacitor TC decreases, the capacitance of the trench capacitor TC may decrease and a frequency of an output signal of a sensor may increase.

Figure 26:
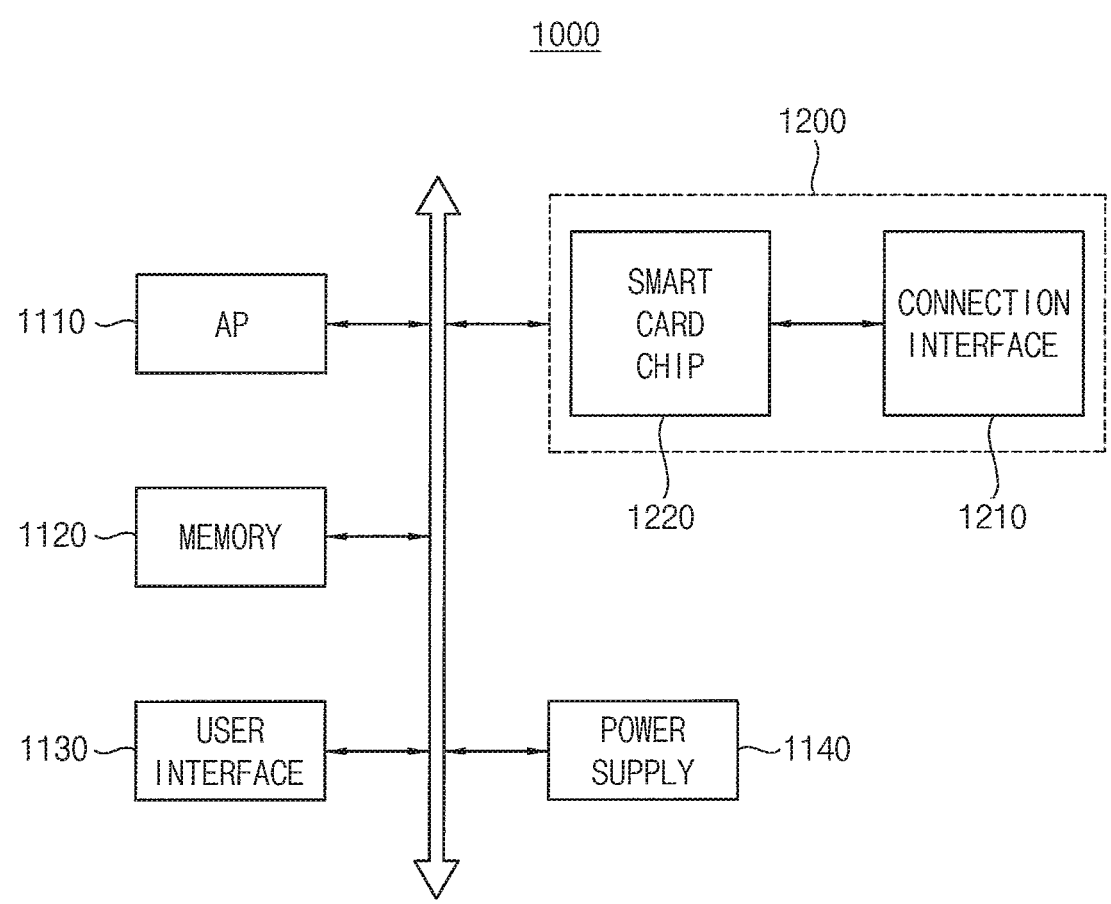
FIG. 26 is a block diagram illustrating an electronic device according to example embodiments.

FIG. 26 is a block diagram illustrating an electronic device according to example embodiments.

Referring to FIG. 26, an electronic device 1000 includes an application processor 1110, a smart card 1200, a memory device 1120, a user interface 1130 and a power supply 1140. In some embodiments, the electronic system 1000 may be a mobile phone, a smart phone, a personal digital assistant (PDA), a portable multimedia player (PMP), a digital camera, a music player, a portable game console, a navigation system, a laptop computer, or the like.

The application processor 1110 may control overall operations of the electronic system 1000. The application processor 1110 may execute applications, such as a web browser, a game application, a video player, etc. In some embodiments, the application processor 1110 may include a single core or multiple cores. For example, the application processor 1110 may be a multi-core processor, such as a dual-core processor, a quad-core processor, a hexa-core processor, etc. The application processor 1110 may include an internal or external cache memory.

The memory device 1120 may store data required for an operation of the electronic system 1000. For example, the memory device 1120 may store a boot image for booting the electronic system 1000, output data to be outputted to an external device and input data received from the external device. For example, the memory device 1120 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM) or a ferroelectric random access memory (FRAM).

The smart card 1200 may include a connection interface 1210 and a smart card chip 1220, may receive voltage from an external card reader through the connection interface 1210 in a contact manner or in a contactless manner and may exchange data with the external card reader. The smart card 1200 may employ the smart card 50 of FIG. 2.

Therefore, the smart card 1200 may include an LDO regulator. The LDO regulator drives an error amplifier with a second driving voltage and a first driving voltage having different voltage levels, respectively in the contact mode and the contactless mode, a first power transistor implemented with the PMOS transistor regulates the second driving voltage based on a first error voltage to provide a first output voltage in the contact mode and a second power transistor implemented with the NMOS transistor regulates the second driving voltage based on the first error voltage to provide the first output voltage in the contactless mode. Accordingly, the LDO regulator may provide the first output voltage to the logic circuit block stably in both the contact mode and the contactless mode.

The user interface 1130 may include at least one input device, such as a keypad or a touch screen, and at least one output device, such as a speaker or a display device. The power supply 1140 may supply a power supply voltage to the electronic system 1000.

In some embodiments, the electronic device 1000 may further include an image processor, and/or a storage device, such as a memory card, a solid state drive (SSD), a hard disk drive (HDD) or a CD-ROM.

In some embodiments, the electronic device 1000 and/or components of the electronic device 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the appended claims and their equivalents.

What is claimed is:

1. An internal voltage generator of a smart card, the internal voltage generator comprising:
  a switched capacitor circuit configured to generate a first driving voltage and a second driving voltage based on a rectified voltage obtained by rectifying an input voltage, wherein the second driving voltage is smaller than the first driving voltage;
a low-drop out (LDO) regulator including a first error amplifier, wherein the LDO regulator is configured to drive the first error amplifier to generate a first error voltage, and regulate the second driving voltage based on the first error voltage to generate a first output voltage; and
a voltage regulator configured to generate a second output voltage by regulating the first driving voltage.

2. The internal voltage generator of claim 1, wherein the first error amplifier is connected between a power terminal and a ground voltage and is configured to amplify a difference between a feedback voltage and a reference voltage to output the first error voltage, the power terminal receiving the second output voltage, and the LDO regulator includes:
a power transistor connected between the second driving voltage and an output node; and
a feedback circuit, connected between the output node and the ground voltage, configured to divide the first output voltage to provide the feedback voltage.

3. The internal voltage generator of claim 2, wherein the power transistor is an n-channel metal-oxide semiconductor (NMOS) transistor having a drain coupled to the second driving voltage, a gate receiving the first error voltage and a source coupled to the output node.

4. The internal voltage generator of claim 2, wherein,
the feedback circuit includes a first feedback resistor and a second feedback resistor connected in series between the output node and the ground voltage,
the first feedback resistor and the second feedback resistor are connected to each other at a feedback node, and
the feedback circuit is configured to provide a voltage of the feedback node as the feedback voltage.

5. The internal voltage generator of claim 1, wherein the switched capacitor circuit includes:
a first switched capacitor converter configured to convert the rectified voltage to the first driving voltage; and
a second switched capacitor converter configured to convert the first driving voltage to the second driving voltage, and
wherein the first driving voltage is smaller than the rectified voltage and the second driving voltage is smaller than the first driving voltage.

6. The internal voltage generator of claim 5, wherein the first switched capacitor converter includes:
a first switch, connected between a first node receiving the rectified voltage and a second node, configured to be switched in response to a first switch control signal;
a capacitor coupled between the second node and a third node;
a second switch, connected between the second node and a fourth node providing the first driving voltage, configured to be switched in response to a second switch control signal;
a third switch, connected between the third node and a ground voltage, configured to be switched in response to the second switch control signal; and
a fourth switch, connected between the third node and the fourth node, configured to be switched in response to the first switch control signal.

7. The internal voltage generator of claim 6, wherein,
when the first switch and the third switch are turned-on in response to the first switch control signal and the second switch and the fourth switch are turned-off in response to the second switch control signal, the rectified voltage is stored in the capacitor, and when the first switch and the third switch are turned-off in response to the first switch control signal and the second switch and the fourth switch are turned-on in response to the second switch control signal, the capacitor is configured to provide the rectified voltage stored in the capacitor as the first driving voltage.

8. The internal voltage generator of claim 1, wherein the voltage regulator comprises:
a second error amplifier configured to generate a second error voltage by amplifying a difference between a feedback voltage and a reference voltage;
a power transistor connected between the first driving voltage and an output node to provide the second output voltage based on the second error voltage; and
a feedback circuit, connected between the output node and a ground voltage, configured to divide the second output voltage to provide the feedback voltage.

9. The internal voltage generator of claim 8, wherein the power transistor is a p-channel metal-oxide semiconductor (PMOS) transistor having a source coupled to the first driving voltage, a gate receiving the second error voltage and a drain coupled to the output node.

10. A smart card configured to perform a fingerprint authentication, the smart card comprising:
a connection interface configured to provide a voltage received from an external card reader as an input voltage;
a smart card chip coupled to the connection interface through a first power terminal and a second power terminal, wherein the smart card chip comprises:
an internal voltage generator configured to:
generate a first driving voltage and a second driving voltage based on the input voltage, the second driving voltage being smaller than the first driving voltage;
regulate the second driving voltage to generate a first output voltage based on the second driving voltage and a second output voltage; and
regulate the first driving voltage to generate the second output voltage;
a fingerprint recognition sensor operating based on the second output voltage, the fingerprint recognition sensor configured to generate a fingerprint image signal based on an input fingerprint; and
a processor operating based on the first output voltage, the processor configured to perform the fingerprint authentication based on the fingerprint image signal.

11. The smart card of claim 10, wherein the internal voltage generator includes:
a switched capacitor circuit configured to generate the first driving voltage and the second driving voltage based on a rectified voltage obtained by rectifying the input voltage; and
a low-drop out (LDO) regulator including a first error amplifier, wherein the LDO regulator is configured to drive the first error amplifier with the second output voltage to generate a first error voltage, and regulates the second driving voltage based on the first error voltage to generate the first output voltage; and
a voltage regulator configured to generate the second output voltage by regulating the first driving voltage.

12. The smart card of claim 11, wherein the first error amplifier is connected between a power terminal and a ground voltage terminal and is configured to amplify a difference between a feedback voltage and a reference voltage to output the first error voltage, the power terminal receiving the second output voltage, and the LDO regulator includes:

a power transistor connected between the second driving voltage and an output node; and a feedback circuit, connected between the output node and the ground voltage, configured to divide the first output voltage to provide the divided first output voltage as the feedback voltage.

13. The smart card of claim 12, wherein the second power transistor is an n-channel metal-oxide semiconductor (NMOS) transistor having a source coupled to the second driving voltage terminal, a gate receiving the first error voltage and a drain coupled to the output node.

14. The smart card of claim 12, wherein, the feedback circuit includes a first feedback resistor and a second feedback resistor connected in series between the output node and the ground voltage, the first feedback resistor and the second feedback resistor are connected to each other at a feedback node, and the feedback circuit is configured to provide a voltage of the feedback node as the feedback voltage.

15. The smart card of claim 11, wherein the voltage regulator comprises:

a second error amplifier configured to generate a second error voltage by amplifying a difference between a feedback voltage and a reference voltage;

a power transistor connected between the first driving voltage and an output node to provide the second output voltage based on the second error voltage; and a feedback circuit, connected between the output node and a ground voltage, configured to divide the second output voltage to provide the feedback voltage.

16. The smart card of claim 15, wherein the power transistor is a p-channel metal-oxide semiconductor (PMOS) transistor having a source coupled to the first driving voltage, a gate receiving the second error voltage and a drain coupled to the output node.

* * * * *